US012661552B2

(12) United States Patent
Takuma et al.

(10) Patent No.: US 12,661,552 B2
(45) Date of Patent: Jun. 23, 2026

(54) BALL POSITION IDENTIFICATION SYSTEM, BALL POSITION IDENTIFICATION METHOD AND INFORMATION STORAGE MEDIUM

(71) Applicant: Rakuten Group, Inc., Tokyo (JP)

(72) Inventors: Ryohei Takuma, Tokyo (JP); Masahiro Kuwahara, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 712 days.

(21) Appl. No.: 17/724,606

(22) Filed: Apr. 20, 2022

(65) Prior Publication Data

US 2022/0339496 A1     Oct. 27, 2022

(30) Foreign Application Priority Data

Apr. 21, 2021     (JP) ................................. 2021-072036

(51) Int. Cl.
*A63B 69/36*          (2006.01)
*A63B 24/00*          (2006.01)
        (Continued)

(52) U.S. Cl.
CPC ...... *A63B 24/0021* (2013.01); *A63B 69/3605* (2020.08); *A63B 71/0622* (2013.01);
        (Continued)

(58) Field of Classification Search
CPC . A63B 69/36; A63B 71/0622; A63B 24/0021; A63B 2220/12; A63B 2220/16; A63B 2220/20; A63B 2220/24; A63B 2220/806; A63B 2024/0025; A63B 2024/0028; A63B 2024/0031; A63B 2024/0053
See application file for complete search history.

(56) References Cited

U.S. PATENT DOCUMENTS

| | | | |
|---|---|---|---|
| 8,512,160 B2 * | 8/2013 | Gobush .............. | A63B 24/0021 473/190 |
| 11,969,626 B2 * | 4/2024 | Lee ........................ | G06T 7/246 |

(Continued)

FOREIGN PATENT DOCUMENTS

| | | | |
|---|---|---|---|
| JP | 2001521403 A | * 11/2001 | ......... A63B 69/3658 |
| JP | 2003-345436 A | 12/2003 | |

(Continued)

OTHER PUBLICATIONS

Extended European Search Report dated Sep. 14, 2022 in European Application No. 22169038.1.

(Continued)

*Primary Examiner* — Steven J Hylinski
(74) *Attorney, Agent, or Firm* — Sughrue Mion, PLLC

(57)          ABSTRACT

A shot identifying module 220 identifies a flight distance of the golf ball and an angle of a direction from the measurement terminal 10 toward the golf ball with respect to a direction toward which the user terminal 10 is directed at a time of the measurement. A terminal position and orientation identifying module 222 identifies a terminal position and a terminal orientation. A ball position identifying module 224 identifies a ball position based on the terminal position, the terminal orientation, the flight distance of the golf ball, and the angle.

10 Claims, 30 Drawing Sheets

(51) Int. Cl.
  *A63B 71/06*        (2006.01)
  *G06V 20/40*        (2022.01)
  *G06V 40/20*        (2022.01)
(52) U.S. Cl.
  CPC .............. *G06V 20/46* (2022.01); *G06V 40/23*
      (2022.01); *A63B 2024/0028* (2013.01); *A63B*
          *2024/0053* (2013.01); *A63B 2220/05*
          (2013.01); *A63B 2220/12* (2013.01); *A63B*
      *2220/24* (2013.01); *A63B 2220/806* (2013.01)

(56)                References Cited

U.S. PATENT DOCUMENTS

| | | | |
|---|---|---|---|
| 12,401,909 B2 * | 8/2025 | Leary ...................... | H04N 23/73 |
| 2005/0026710 A1 * | 2/2005 | Pao ......................... | A63B 71/06 |
| | | | 473/141 |
| 2008/0182685 A1 * | 7/2008 | Marty .................... | A63B 69/38 |
| | | | 473/407 |
| 2010/0104136 A1 * | 4/2010 | Kiraly ................ | A63B 24/0021 |
| | | | 382/103 |
| 2010/0210377 A1 * | 8/2010 | Lock .................. | A63B 69/3658 |
| | | | 473/409 |
| 2011/0230274 A1 * | 9/2011 | Lafortune .............. | A63B 15/00 |
| | | | 473/217 |
| 2012/0007885 A1 * | 1/2012 | Huston ................. | H04W 4/029 |
| | | | 345/633 |

| | | | |
|---|---|---|---|
| 2013/0113961 A1 * | 5/2013 | Ishii ....................... | H04N 5/262 |
| | | | 348/E5.026 |
| 2013/0260914 A1 * | 10/2013 | Ishii ................... | G06Q 10/0639 |
| | | | 473/409 |
| 2015/0057095 A1 * | 2/2015 | Leech ..................... | G01S 13/66 |
| | | | 702/182 |
| 2016/0217325 A1 | 7/2016 | Bose et al. | |
| 2019/0224552 A1 * | 7/2019 | Kiraly ............... | A63B 24/0021 |

FOREIGN PATENT DOCUMENTS

| | | | | |
|---|---|---|---|---|
| JP | 2005-233800 A | | 9/2005 | |
| JP | 3782009 B2 * | | 6/2006 | ........ A63B 24/0021 |
| JP | 2011-212419 A | | 10/2011 | |
| JP | 2016-077775 A | | 5/2016 | |
| JP | 2020-99707 A | | 7/2020 | |
| KR | 102129129 B1 * | | 7/2020 | ............ G01D 5/142 |
| WO | WO-0017804 A1 * | | 3/2000 | ........ A63B 24/0003 |
| WO | 2006/082615 A1 | | 8/2006 | |
| WO | WO-2010040219 A1 * | | 4/2010 | .......... G06V 10/255 |
| WO | WO-2011013550 A1 * | | 2/2011 | ........ A63B 69/3614 |
| WO | WO-2013106846 A2 * | | 7/2013 | ............ A63B 53/02 |

OTHER PUBLICATIONS

Japanese Office Action JP 2021-072036 dated on Mar. 1, 2022.
Anonymous, "Extended Kalman filter for object tracking-MATLAB-
MathWorks Benelux", Jul. 23, 2024, XP093188935, pp. 1-7.

* cited by examiner

FIG.8

| P(n,b) |
|--------|
| P(n,c) |

FIG.10

| |
|---|
| P(n,b) |
| P(n,c) |
| P(n+1,b) |
| P(n+1,c) |
| P(n,b)−P(n+1,a) |
| P(n,b)−P(n+1,b) |
| P(n,c)−P(n+1,a) |
| P(n,c)−P(n+1,b) |

FIG.12

| |
|---|
| P(n,b) |
| P(n,c) |
| P(n+1,b) |
| P(n+1,c) |
| P(n,b)−P(n+1,a) |
| P(n,b)−P(n+1,b) |
| P(n,c)−P(n+1,a) |
| P(n,c)−P(n+1,b) |
| P(n+2,b) |
| P(n,b)−P(n+2,a) |
| P(n,c)−P(n+2,a) |
| P(n+1,c)−P(n+2,b) |
| P(n,b)−P(n+1,a)−P(n+2,a) |

FIG.21

| | INSIDE-OUT | INSIDE-IN | OUTSIDE-IN |
|---|---|---|---|
| OPEN | | | |
| SQUARE | | | |
| CLOSED | | | |

| | REMAINING DISTANCE | RECOMMENDED CLUB NUMBER |
|---|---|---|
| PLAYER A | 140yd | 8I |

| | REMAINING DISTANCE | RECOMMENDED CLUB NUMBER |
|---|---|---|
| PLAYER A | 130 ～150yd | 7I, 8I, 9I |

| | REMAINING DISTANCE | RECOMMENDED CLUB NUMBER | SHOT ORDER |
|---|---|---|---|
| PLAYER A | 130〜150yd | 7I, 8I, 9I | 2 |
| PLAYER B | 110〜130yd | 9I,PW | 1 |
| PLAYER C | 145〜155yd | 5I | 3 |
| PLAYER D | 170〜180yd | 3W | 4 |

FIG.28

| | |
|---|---|
| 1W | 240 YARDS |
| 3W | 220 YARDS |
| 5W | 200 YARDS |
| 4U | 180 YARDS |
| 5U | 170 YARDS |
| 6I | 160 YARDS |
| 7I | 150 YARDS |
| 8I | 140 YARDS |
| 9I | 130 YARDS |
| PW | 120 YARDS |
| AW | 105 YARDS |
| SW | 90 YARDS |

FIG.29

| | |
|---|---|
| 1W | 160 YARDS |
| 3W | 140 YARDS |
| 5W | 130 YARDS |
| 4U | 110 YARDS |
| 5U | 100 YARDS |
| 6I | 95 YARDS |
| 7I | 90 YARDS |
| 8I | 85 YARDS |
| 9I | 80 YARDS |
| PW | 75 YARDS |
| AW | 65 YARDS |
| SW | 50 YARDS |

BALL POSITION IDENTIFICATION SYSTEM, BALL POSITION IDENTIFICATION METHOD AND INFORMATION STORAGE MEDIUM

CROSS-REFERENCE TO RELATED APPLICATION

The present application claims priority from Japanese application JP 2021-072036 filed on Apr. 21, 2021, the content of which is hereby incorporated by reference into this application.

BACKGROUND OF THE INVENTION

1. Field of the Invention

The present invention relates to a ball position identification system, a ball position identification method, and an information storage medium.

2. Description of the Related Art

In Japanese Patent Application Laid-open No. 2005-233800 A, there is described a measurement device configured to measure a fall point of a golf ball based on an image captured by a CCD camera fixed to an upper portion of a pole.

SUMMARY OF THE INVENTION

In the technology as described in Japanese Patent Application Laid-open No. 2005-233800 A, pixels included in the captured image and a geographical position of the fall point are associated with each other in advance. Accordingly, a position of the CCD camera is required to be fixed to a predetermined position.

The present invention has been made in view of the above-mentioned problem, and has an object to provide a ball position identifying system, a ball position identifying method, and an information storage medium which are capable of appropriately identifying a geographical position of a shot golf ball without fixing a measurement terminal which measures the golf ball to a predetermined position.

According to at least one embodiment of the present invention, there is provided a ball position identifying system, including: a shot identifying module configured to identify, based on a measurement value being acquired from a measurement terminal which has measured a shot golf ball and relating to the golf ball, a flight distance of the golf ball and an angle of a direction from the measurement terminal toward the golf ball with respect to a direction toward which the measurement terminal is directed at a time of the measurement; a terminal position and orientation identifying module configured to identify a terminal position being a geographical position of the measurement terminal at the time of the measurement and a terminal orientation being an orientation toward which the measurement terminal is directed at the time of the measurement; and a ball position identifying module configured to identify a ball position being a geographical position of the shot golf ball based on the terminal position, the terminal orientation, the flight distance, and the angle.

In at least one aspect of the present invention, the ball position identifying system further includes: a captured moving image acquisition module configured to acquire a captured moving image which is captured by an imaging unit included in the measurement terminal, and shows a scene of a player shooting the golf ball; and an intra-image position identifying module configured to identify an intra-image position being a position of the golf ball appearing in at least one frame image included in the captured moving image, and the shot identifying module is configured to identify the flight distance and the angle based on the intra-image position.

In this aspect, the ball position identifying system may further include an accuracy identifying module configured to identify, based on the number of frame images in each of which the intra-image position is identified, an accuracy of at least one of the identified flight distance or the identified angle.

Further, the ball position identifying system may further include: a remaining distance identifying module configured to identify a range of a remaining distance in a hole of ongoing golf play based on the ball position and the accuracy; and a recommended club number specifying module configured to specify a club number which is recommended to be used for a next shot, the number of club numbers corresponding to the flight distance and the range of the remaining distance, based on the flight distance and the range of the remaining distance.

Further, according to at least one aspect of the present invention, the ball position identifying system may further include: a remaining distance identifying module configured to identify a remaining distance in a hole of ongoing golf play based on the ball position; and a recommended club number specifying module configured to specify a club number which is recommended to be used for a next shot based on the flight distance and the remaining distance.

In this aspect, the ball position identifying system may further include an accuracy identifying module configured to identify an accuracy of at least one of the flight distance or the angle, the remaining distance identifying module may be configured to identify a range of the remaining distance based on the ball position and the accuracy, and the recommended club number specifying module may be configured to specify the club number, the number of club numbers corresponding to the range of the remaining distance.

Further, in at least one aspect of the present invention, the ball position identifying module may be configured to identify the ball positions for a plurality of golf balls shot by players different from one another, and the ball position identifying system may further include a display control module configured to display a plurality of the ball positions on a display unit included in the measurement terminal.

In this aspect, the ball position identifying system may further include a notification module configured to notify information on orders of remaining distances of a plurality of the players, the information being generated based on the plurality of the ball positions.

Further, the ball position identifying system may further include a ball position data reception module configured to receive ball position data indicating the ball position, and the display control module may be configured to display, on the display unit, the ball position identified based on the measurement value acquired from the measurement terminal and the ball position identified based on the received ball position data.

Further, in at least one aspect of the present invention, the ball position identifying system further includes a ball position data transmission module configured to transmit ball position data indicating the ball position.

Further, according to at least one embodiment of the present invention, there is provided a ball position identifying method, including: identifying, based on a measurement value being acquired from a measurement terminal which has measured a shot golf ball and relating to the golf ball, a flight distance of the golf ball and an angle of a direction from the measurement terminal toward the golf ball with respect to a direction toward which the measurement terminal is directed at a time of the measurement; identifying a terminal position being a geographical position of the measurement terminal at the time of the measurement and a terminal orientation being an orientation toward which the measurement terminal is directed at the time of the measurement; and identifying a ball position being a geographical position of the shot golf ball based on the terminal position, the terminal orientation, the flight distance, and the angle.

Further, according to at least one embodiment of the present invention, there is provided a non-transitory computer readable information storage medium storing a program according to the present invention causes a computer to execute the procedures of: identifying, based on a measurement value being acquired from a measurement terminal which has measured a shot golf ball and relating to the golf ball, a flight distance of the golf ball and an angle of a direction from the measurement terminal toward the golf ball with respect to a direction toward which the measurement terminal is directed at a time of the measurement; identifying a terminal position being a geographical position of the measurement terminal at the time of the measurement and a terminal orientation being an orientation toward which the measurement terminal is directed at the time of the measurement; and identifying a ball position being a geographical position of the shot golf ball based on the terminal position, the terminal orientation, the flight distance, and the angle.

BRIEF DESCRIPTION OF THE DRAWINGS

FIG. 8 is a table for showing an example of trajectory list candidates.

FIG. 10 is a table for showing an example of the trajectory list candidates.

FIG. 12 is a table for showing an example of the trajectory list candidates.

FIG. 21 is a table for showing an example of a variation of an impact image.

FIG. 28 is a table for showing an example of club number-flight distance association data.

FIG. 29 is a table for showing an example of the club number-flight distance association data.

DESCRIPTION OF THE EMBODIMENTS

First Embodiment

A first embodiment, which is one embodiment of the present invention, is now described in detail with reference to the drawings.

Figure 1:
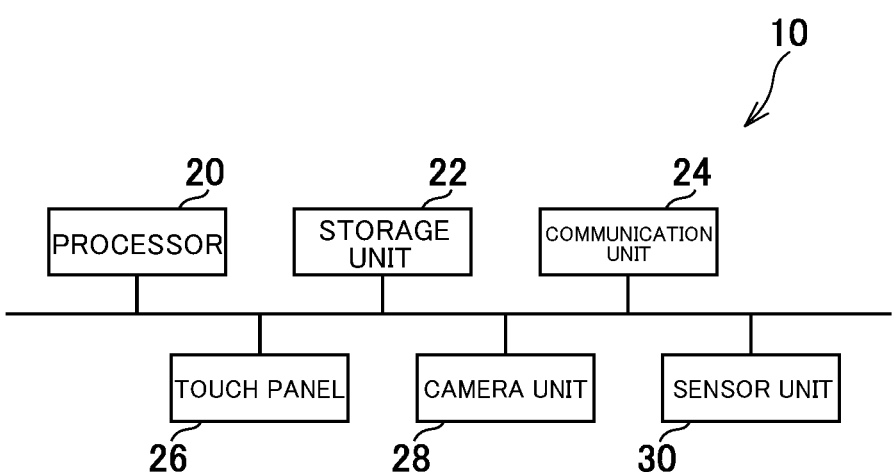
FIG. 1 is a diagram for illustrating an example of a configuration of a user terminal in at least one embodiment of the present invention.

FIG. 1 is a diagram for illustrating an example of a configuration of a user terminal 10 in the first embodiment. The user terminal 10 in the first embodiment is a computer, such as a cellular phone (including a smartphone) and a portable information terminal (including a tablet-type computer). As illustrated in FIG. 1, the user terminal 10 in the first embodiment includes a processor 20, a storage unit 22, a communication unit 24, a touch panel 26, a camera unit 28, and a sensor unit 30.

The processor 20 is, for example, a program control device such as a microprocessor which operates in accordance with a program installed in the user terminal 10. The storage unit 22 is, for example, a storage element, such as a ROM or a RAM, or a solid-state drive (SSD). The storage unit 22 stores, for example, a program to be executed by the processor 20. The communication unit 24 is, for example, a communication interface for wired communication or wireless communication, and exchanges data with a computer such as a server through a computer network such as the Internet.

The touch panel 26 displays and outputs information in accordance with instructions input from the processor 20, and outputs to the processor 20 content of an operation performed by the user.

The camera unit 28 is, for example, an imaging device such as a digital video camera capable of capturing a moving image.

The sensor unit 30 is, for example, a sensing device, such as a GPS module, an acceleration sensor, a motion sensor, or an azimuth sensor. In the first embodiment, a case in which the sensor unit 30 is included in the user terminal 10 is described, but the sensor unit 30 may be external to the user terminal 10.

In the first embodiment, for example, a user (hereinafter referred to as "operation user") who operates the user terminal 10 uses the camera unit 28 of the user terminal 10 to capture an image of a player who is performing swing of golf on a golf course or a golf driving range. A moving image showing this swinging player is generated.

In the first embodiment, before an image of the swing is captured, a position and an inclination of the user terminal 10 are adjusted so that a position of the player with respect to a position of the camera unit 28 is a position within a predetermined allowable range and a direction of the player with respect to a capturing direction is a direction within a predetermined allowable range. Moreover, in the first embodiment, after the adjustment of the user terminal 10, when the operation user executes a predetermined operation, an image of the player is captured by the camera unit 28, and the moving image showing this swinging player is generated. In the first embodiment, the moving image is generated at a predetermined frame rate (for example, 60 fps).

After that, in the first embodiment, camera shake compensation processing is executed on the moving image generated as described above, to thereby correct each frame image so that the player appears at substantially the same position in all of the frame images. The moving image on which the camera shake correction processing has been executed is hereinafter referred to as "captured moving image." In the first embodiment, it is assumed that the number of vertical pixels and the number of horizontal pixels of all of the frame images included in the generated captured moving image are the same.

A frame image having a frame number of "n" (n=1, 2, 3, . . . ) is hereinafter expressed as "frame image (n)." Moreover, a frame corresponding to the frame image (n) is expressed as "n-th frame."

After that, in the first embodiment, swing analysis processing is executed on the captured moving image. After that, there is generated an analyzed moving image formed by superimposing images indicating results of the swing analysis processing on the captured moving image. Then, the generated analyzed moving image is stored in the storage unit 22 of the user terminal 10.

After that, a user of the user terminal 10, such as the above-mentioned player or operation user, appropriately executes a predetermined operation, to thereby be capable of replaying the analyzed moving image stored in the storage unit 22.

Figure 2:
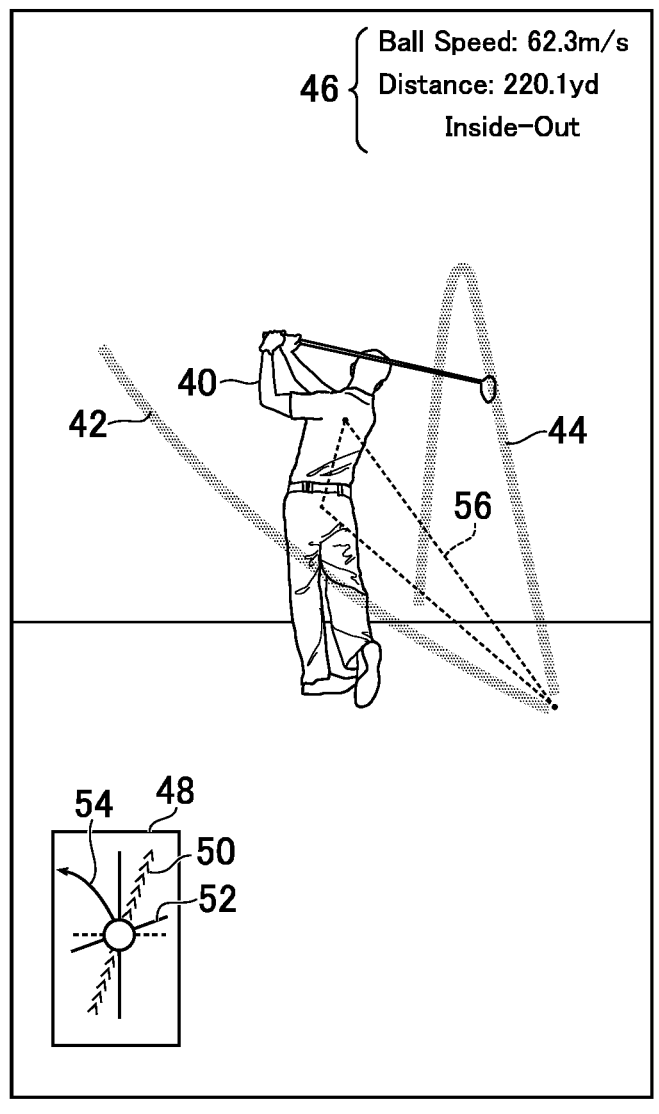
FIG. 2 is a view for illustrating an example of a frame image included in an analyzed moving image.

FIG. 2 is a view for illustrating an example of a frame image at a time of finish included in the replayed analyzed moving image. In the frame image of FIG. 2, a clubhead trajectory effect image 42 indicating a trajectory of a clubhead and a ball trajectory effect image 44 indicating a trajectory of a ball are superimposed on the frame image included in the captured moving image in which a player 40 is captured.

Moreover, in a right upper portion of the frame image of FIG. 2, analysis result information 46 is arranged. In the example of FIG. 2, as the analysis result information 46, there are arranged character strings indicating a ball speed, a flight distance, and a type of the swing trajectory, such as an outside-in swing trajectory, an inside-in swing trajectory, or an inside-out swing trajectory.

Moreover, in a left lower portion of the frame image of FIG. 2, there is arranged an impact image 48 expressing the trajectory of the clubhead, a direction of a face of the club at a time of impact, and a curve direction of the ball.

The impact image 48 of FIG. 2 includes a head movement direction image 50, a face direction image 52, and a ball direction image 54. The head movement direction image 50 is, for example, an image indicating a movement direction of the clubhead at the time of the impact, and, in the example of FIG. 2, a direction along which the arrows are arranged corresponds to the movement direction of the clubhead at the time of the impact. The face direction image 52 is, for example, an image indicating the direction of the face of the club at the time of the impact, and, in the example of FIG. 2, the face direction image 52 is an image having a line form, and an extension direction of the face direction image 52 corresponds to the direction of the face of the club at the time of the impact. The ball direction image 54 is, for example, an image indicating an outgoing direction and a curve direction of the ball. In the ball direction image 54 in the first embodiment, a direction perpendicular to the extension direction of the face direction image 52 having the line form is indicated as the outgoing direction of the ball.

Moreover, the frame image of FIG. 2 includes a V zone image indicating a V zone through which the trajectory of the clubhead is desired to pass for a downswing.

As described above, according to the first embodiment, the user of the user terminal 10 can check the analysis results of the golf swing of the player.

Description is now further given of functions of the user terminal 10 in the first embodiment and processing executed in the user terminal 10 in the first embodiment while the above-mentioned swing analysis processing is focused on.

Figure 3:
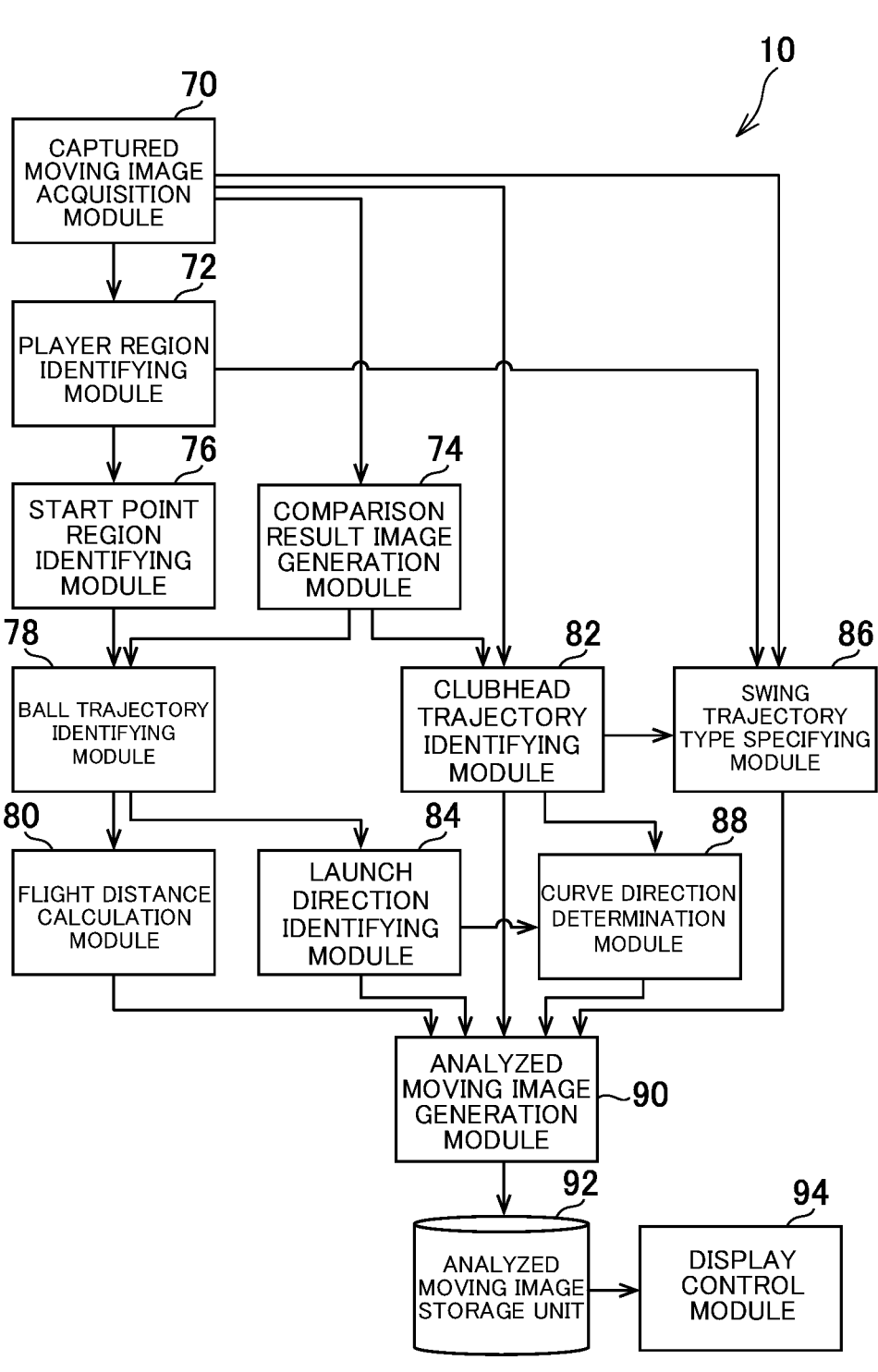
FIG. 3 is a functional block diagram for illustrating an example of functions of the user terminal in the at least one embodiment of the present invention.

FIG. 3 is a functional block diagram for illustrating an example of the functions implemented in the user terminal 10 in the first embodiment. It is not required to implement all of the functions of FIG. 3 in the user terminal 10 in the first embodiment. Moreover, functions other than the functions of FIG. 3 may be implemented.

The user terminal 10 in the first embodiment has a function as a swing analysis system which analyzes the swing of the golf. Moreover, as illustrated in FIG. 3, the user terminal 10 in the first embodiment includes, for example, in terms of the function, a captured moving image acquisition module 70, a player region identifying module 72, a comparison result image generation module 74, a start point region identifying module 76, a ball trajectory identifying module 78, a flight distance calculation module 80, a clubhead trajectory identifying module 82, a launch direction identifying module 84, a swing trajectory type specifying module 86, a curve direction determination module 88, an analyzed moving image generation module 90, an analyzed moving image storage unit 92, and a display control module 94.

The captured moving image acquisition module 70, the player region identifying module 72, the comparison result image generation module 74, the start point region identifying module 76, the ball trajectory identifying module 78, the flight distance calculation module 80, the clubhead trajectory identifying module 82, the launch direction identifying module 84, the swing trajectory type specifying module 86, the curve direction determination module 88, and the analyzed moving image generation module 90 are implemented by mainly the processor 20. The analyzed moving image storage unit 92 is implemented mainly by the storage unit 22. The display control module 94 is implemented by mainly the processor 20 and the touch panel 26.

The above-mentioned functions may also be implemented by the user terminal 10 executing a program including commands corresponding to the functions, which is installed in the user terminal 10 being a computer. The program may be supplied to the user terminal 10 via, for example, a computer-readable information storage medium, such as an optical disc, a magnetic disk, a magnetic tape, and a magneto-optical disk, or the Internet.

In the first embodiment, the captured moving image acquisition module 70 acquires, for example, the captured moving image showing the player 40 performing the swing of the golf. In this case, as described above, the captured moving image on which the camera shake compensation processing has been executed may be acquired.

Moreover, as illustrated in FIG. 2, the captured moving image may be a moving image of the player 40 captured from one direction. Further, the captured moving image may be a moving image showing the player 40 viewed from a rear side in a target direction of the ball.

As described above, in the first embodiment, it is assumed that the captured moving image taken at the predetermined frame rate (for example, 60 fps) is acquired.

Figure 4:
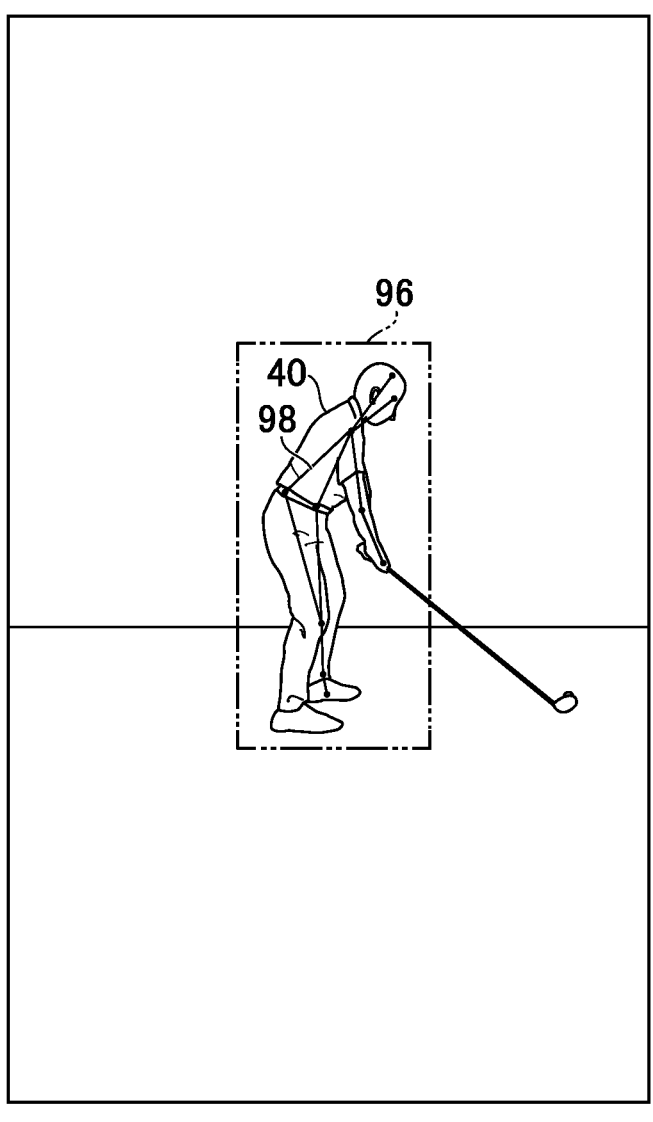
FIG. 4 is a view for illustrating an example of a player region.

In the first embodiment, the player region identifying module 72 identifies, for example, a player region 96 being a region which is exemplified in FIG. 4 and shows the player 40 in the frame image included in the captured moving image.

In this case, for example, a trained machine learning model such as OpenPose may be installed in the user terminal 10 in the first embodiment. Moreover, the player region identifying module 72 may use the trained machine learning model to identify positions of nodes and links of a skeleton model 98 representing bones of the player 40 in the frame image. Positions of a plurality of nodes included in the skeleton model 98 of FIG. 4 are associated with respective positions of body portions of the player 40, such as the shoulders and the waist.

The player region identifying module 72 may identify, as the player region 96, a rectangular region having a position, a shape, and a size identified based on the skeleton model 98. For example, a region obtained by extending a rectangular region circumscribing the skeleton model 98 by a predetermined magnification without changing a position of a center may be identified as the player region 96.

In this case, the player region 96 may be identified based on one representative frame image. Moreover, the player region 96 may be identified based on a plurality of frame images. In this case, a representative region of rectangular regions identified for the plurality of frame images, such as a common region or an average region of the rectangular regions identified for the plurality of frame images, may be identified as the player region 96.

Moreover, for example, in a case in which a person other than the player appears in the captured moving image, a plurality of candidates of the player region 96 may be identified. In this case, any one of the candidates may be identified as the player region 96 based on predetermined conditions, such as a size of the region, a distance from the center of the frame image, and a ratio between a height and a width of the region.

Figure 5:
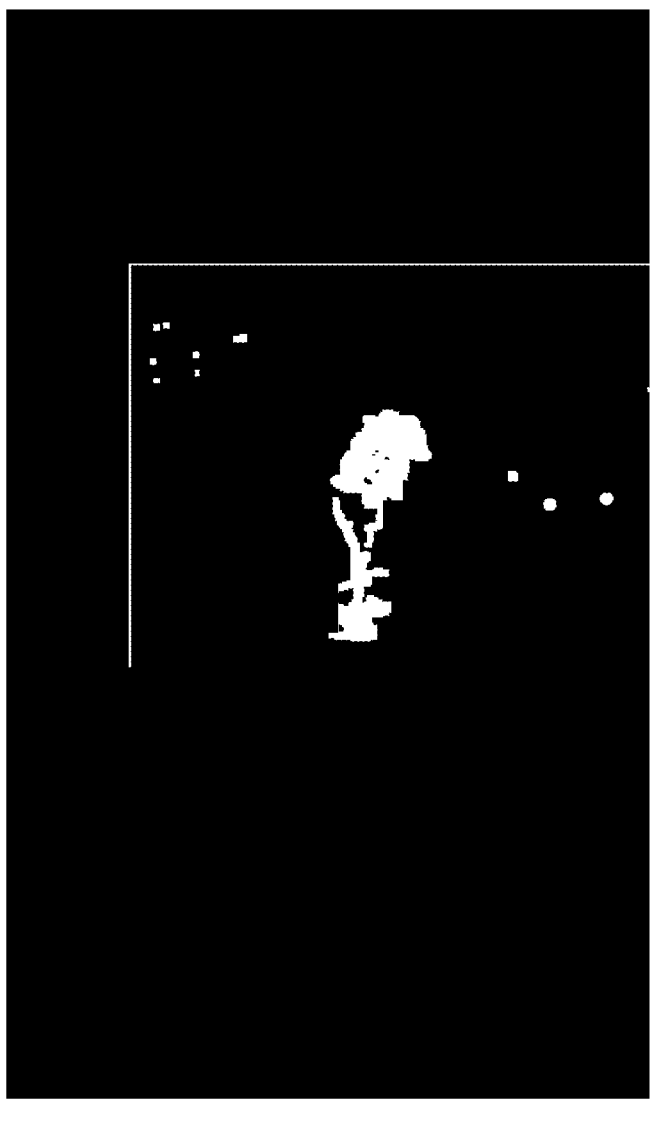
FIG. 5 is a view for illustrating an example of a comparison result image.

In the first embodiment, the comparison result image generation module 74 uses, for example, an image difference method or the like to generate a comparison result image exemplified in FIG. 5 based on the captured moving image.

In the first embodiment, for each of the plurality of frame images included in the captured moving image, a comparison result image associated with this frame image is generated. For example, for the frame image (n), a comparison result image (n) is generated as the corresponding comparison result image.

The comparison result image generation module 74 may, for example, smooth frame images of a predetermined number of consecutive frame images (for example, 20 frames), to thereby generate the comparison image. The comparison image (n) may be generated by smoothing 20 frame images of from, for example, a frame image (n−20) to a frame image (n−1) included in the captured moving images. The comparison image (n) may be generated by, for example, setting, as a pixel value of each pixel, an average value of pixel values of pixels included in the frame images of from the frame image (n−20) to the frame image (n−1) corresponding to this pixel.

After that, the comparison result image generation module 74 calculates, for each of the pixels associated with one another, a difference between a pixel value of the frame image (n) being a frame image subsequent to the predetermined number of frame images and the pixel value of the above-mentioned comparison image (n). Then, the comparison result image generation module 74 generates the comparison result image (n) which indicates, for each pixel, whether a difference in pixel value between the frame image (n) and the comparison image (n) is equal to or larger than a predetermined value. In the comparison result image of FIG. 5, a pixel having the difference in pixel value equal to or larger than the predetermined value is expressed in white. A pixel having the difference in pixel value smaller than the predetermined value is expressed in black. A pixel having a difference in pixel value equal to or larger than the predetermined value, that is, a pixel expressed in white in the comparison result image of FIG. 5, is hereinafter referred to as "change pixel."

In the first embodiment, when the comparison image is generated based on the 20 frame images as described above, for each frame image starting from a frame image (21), a comparison result image associated with this frame image is generated.

Figure 6:
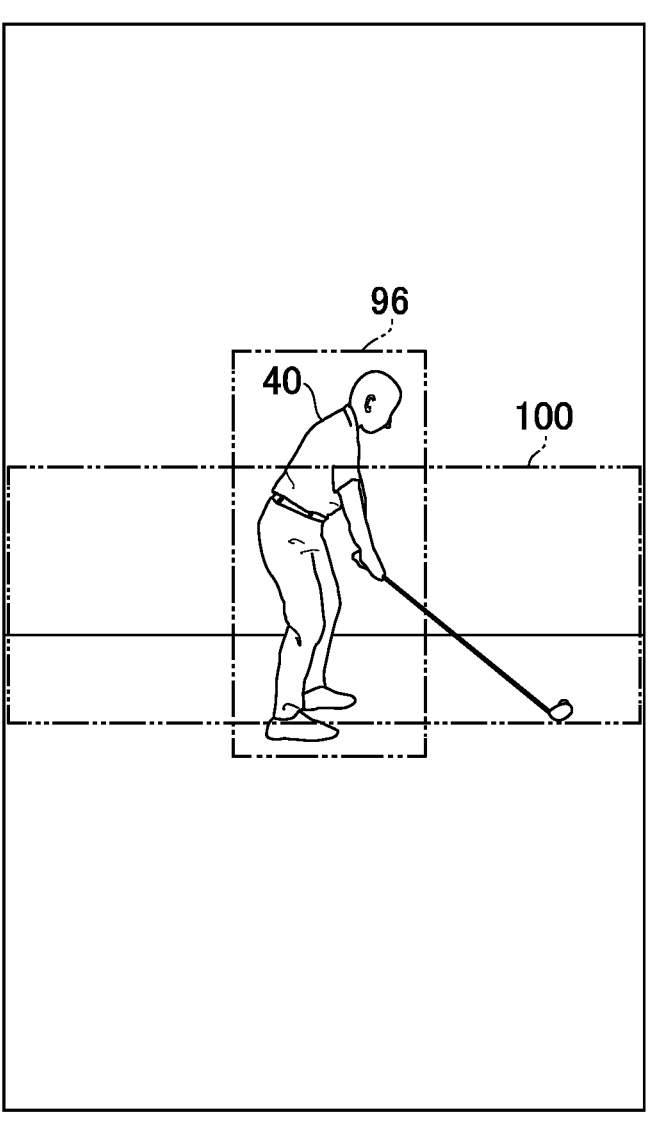
FIG. 6 is a view for illustrating an example of a start point region.

In the first embodiment, for example, the start point region identifying module 76 identifies a start point region 100 which is exemplified in FIG. 6, and is used to identify a trajectory of the ball by the ball trajectory identifying module 78 described below.

The start point region 100 in the first embodiment is, for example, a rectangular region uniquely identified based on the player region 96. In this case, for example, a position of a left edge of the start point region 100 may be the same as a position of a left edge of the frame image, and a position of a right edge of the start point region 100 may be the same as a position of a right edge of the frame image. Moreover, a position of an upper edge of the start point region 100 may be a position downward from an upper edge of the player region 96 by 30% of a length of the player region 96 in the up-and-down direction. Further, a position of a lower edge of the start point region 100 may be the same position as a position of a lower edge of the player region 96 or a position at the footing of the player 40. This method is only an example of the method of identifying the start point region 100, and the start point region 100 may be identified by another method.

In the first embodiment, the ball trajectory identifying module 78 identifies a trajectory of the ball appearing in the captured moving image based on, for example, this captured moving image.

In the first embodiment, the trajectory of the ball is identified as a list in which the positions at which the ball appears in a plurality of frame images included in the captured moving image are associated with one another. This list is hereinafter referred to as "trajectory list."

With reference to FIG. 7 to FIG. 12, an example of processing of identifying the trajectory of the ball by the ball trajectory identifying module 78 is described.

As described above, it is assumed that, for each of the frame images starting from the frame image (21), a comparison result image associated with this frame image is generated. In this case, for the comparison result image starting from the comparison result image (21), at least one pixel block of the change pixels within a range of a predetermined number of pixels and within a predetermined region is identified. After that, for each of those pixel blocks, a position of a representative point (for example, center) is identified as a candidate ball position.

Figure 7:
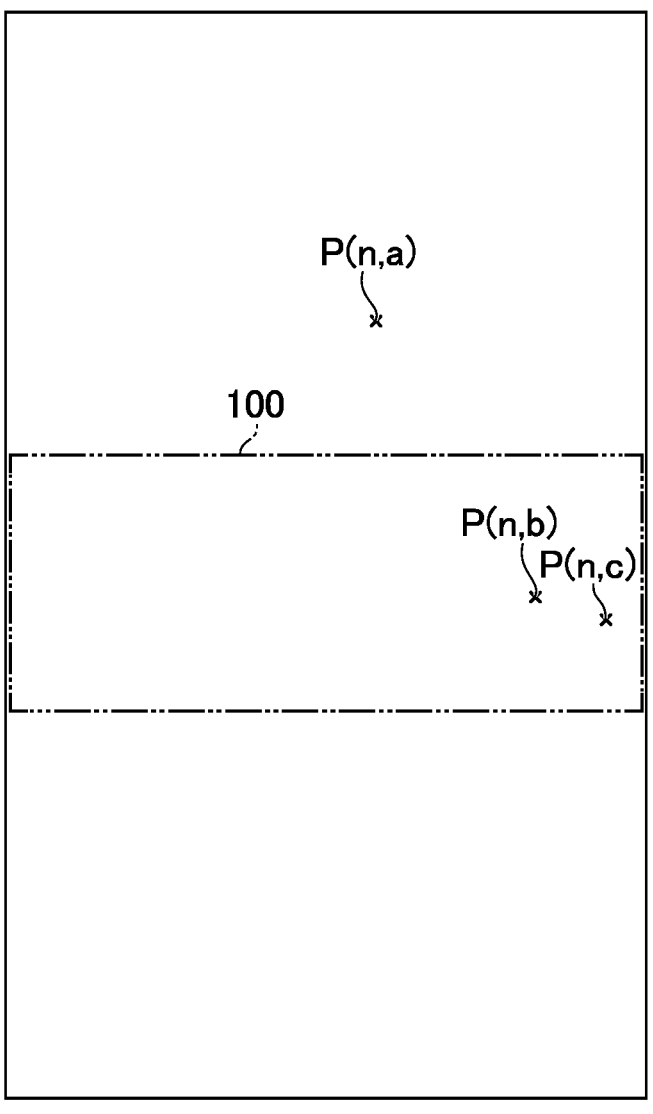
FIG. 7 is a view for illustrating an example of candidate ball positions.

It is assumed that, for example, candidate ball positions are not identified up to the comparison result image (n−1), and three candidate ball positions (P(n, a), P(n, b), and P(n, c)) of FIG. 7 are identified in the comparison result image (n).

After that, the candidate ball positions are narrowed down to candidate ball positions being first elements of candidates of the trajectory list (hereinafter referred to as "trajectory list candidates"). For example, a candidate ball position outside the start point region 100 is excluded from the candidate ball positions. In this manner, P(n, a) is excluded from the candidate ball positions being the first elements, and the candidate ball positions are narrowed down to P(n, b) and P(n, c) as the first elements.

In this case, as illustrated in FIG. 8, P(n, b) and P(n, c) each having one element are identified as the trajectory list candidates.

Figure 9:
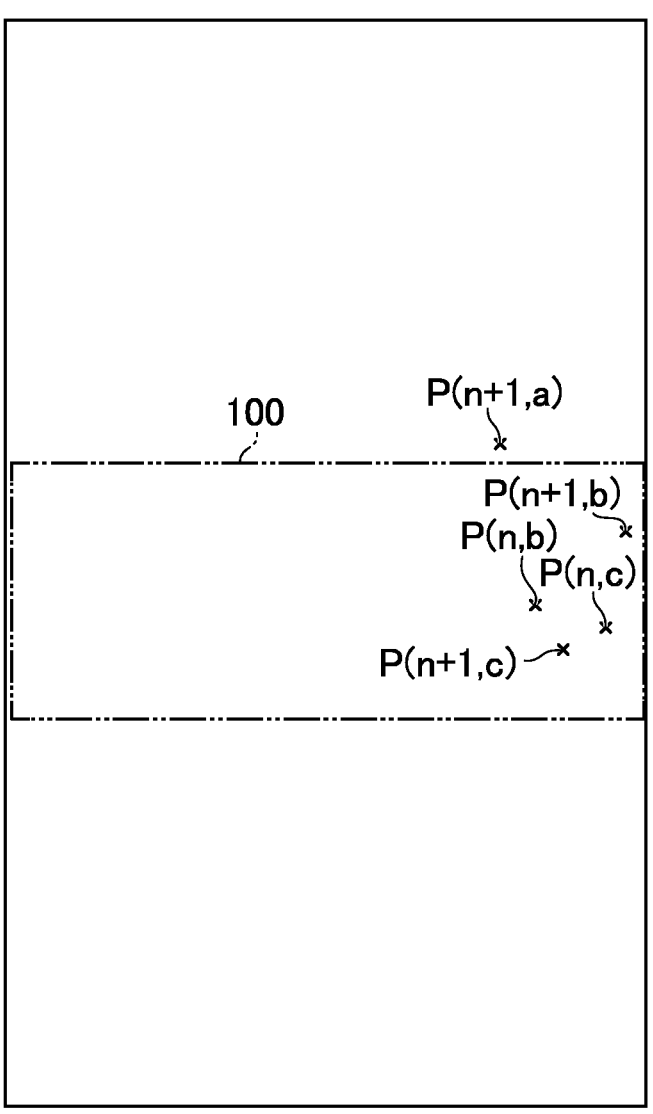
FIG. 9 is a view for illustrating an example of the candidate ball positions.

After that, in a comparison result image (n+1), it is assumed that three candidate ball positions (P(n+1, a), P(n+1, b), and P(n+1, c)) of FIG. 9 are identified.

In FIG. 9, in addition to those candidate ball positions, P(n, b) and P(n, c), which have not been excluded from the candidate ball positions, are shown.

In this case, P(n+1, a) outside the start point region 100 is excluded from the candidate ball positions being the first elements. Meanwhile, the candidate ball positions are narrowed down to P(n+1, b) and P(n+1, c) as the first elements.

Moreover, under the state in which the trajectory list candidates already exist, candidate ball positions to be associated with the existing trajectory list candidates are also identified.

For example, a candidate ball position to be associated with P(n, b) is identified from among (n+1, a), P(n+1, b), and P(n+1, c). For example, a candidate ball position which satisfies predetermined conditions, such as a distance from P(n, b) is longer than a predetermined distance, the distance from P(n, b) is shorter than a predetermined distance, and the position is lower than P(n, b), is excluded from the candidate ball positions to be associated with P(n, b). For example, P(n+1, c) is lower in position than P(n, b), and is thus excluded from the candidate ball positions. After that, the candidate ball positions to be associated with P(n, b) are narrowed down to P(n+1, a) and P(n+1, b).

Similarly, a candidate ball position to be associated with P(n, c) is identified from among P(n+1, a), P(n+1, b), and P(n+1, c). In this case, for example, P(n+1, c) is lower in position than P(n, c), and is thus excluded from the candidate ball positions. After that, the candidate ball positions to be associated with P(n, c) are narrowed down to P(n+1, a) and P(n+1, b).

After that, as shown in FIG. 10, the trajectory list candidates are added. In the above-mentioned example, P(n+1, b), P(n+1, c), P(n, b)-P(n+1, a), P(n, b)-P(n+1, b), P(n, c)-P(n+1, a), and P(n, c)-P(n+1, b) are added to the trajectory list candidates. In FIG. 10, trajectory list candidates each including a plurality of candidate ball positions associated with each other are also shown. For example, a trajectory list candidate including the element P(n, b) and the element P(n+1, a) is shown as P(n, b)-P(n+1, a) in FIG. 10. The elements P(n, b) and P(n, c) of FIG. 8 are not overwritten, and remain in the trajectory list candidates.

Figure 11:
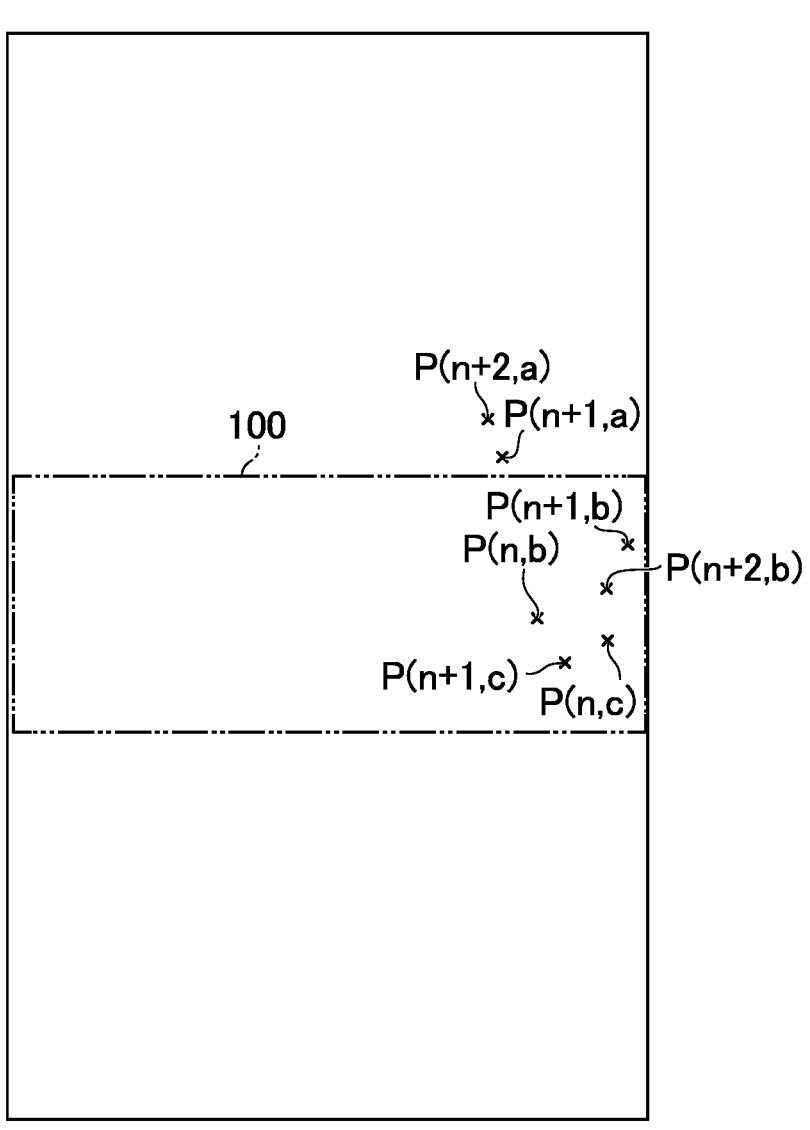
FIG. 11 is a view for illustrating an example of the candidate ball positions.

After that, in a comparison result image (n+2), it is assumed that two candidate ball positions (P(n+2, a) and P(n+2, b)) of FIG. 11 are identified.

In FIG. 11, in addition to those candidate ball positions, the candidate ball positions which are not excluded are also shown. From the candidate ball positions, P(n+2, a) outside the start point region 100 is excluded from the candidate ball positions being the first elements. Meanwhile, the candidate ball positions of a start point are narrowed down to P(n+2, b).

Moreover, as described above, candidate ball positions to be associated with trajectory list candidates each having one element are identified. For example, P(n+2, b) has a distance from P(n, c) longer than the predetermined distance, and is thus excluded from the candidate ball positions to be associated with P(n, c). Further, P(n+2, a) has a distance from P(n+1, c) longer than the predetermined distance, and is thus excluded from the candidate ball positions to be associated with P(n+1, c).

Moreover, after that, candidate ball positions to be associated with trajectory list candidates each having a plurality of elements are also identified. In this case, a candidate ball position which satisfies predetermined conditions, such as a distance from a candidate ball position being the last element of the trajectory list candidate is longer than a predetermined distance, a distance from the candidate ball position being the last element of the trajectory list candidate is shorter than a predetermined distance, and the position is lower than the candidate ball position being the last element of the trajectory list candidate, may be excluded from the candidate ball positions to be associated with the trajectory list candidates.

Moreover, in addition to those conditions, a candidate ball position which satisfies predetermined conditions relating to a trajectory list candidate including a plurality of elements, such as an angle of the trajectory suddenly changes (curves at an angle equal to or more than a predetermined angle), a speed of a trajectory suddenly changes (decreases by a predetermined speed or more or increases by a predetermined speed or more), and a direction of the trajectory changes (a trajectory directed rightward directs leftward or a trajectory directed leftward directs rightward), may be excluded from the candidate ball positions to be associated with the trajectory list candidates.

In the example of FIG. 11, P(n+2, a) has a sudden change in the angle of the trajectory with respect to a trajectory connecting between P(n, b) and P(n+1, b), and is thus excluded from candidate ball positions to be associated with P(n, b)-P(n+1, b). Moreover, P(n+2, a) has a sudden decrease in the speed of the trajectory with respect to a trajectory connecting between P(n, c) and P(n+1, a), and is thus excluded from candidate ball positions to be associated with P(n, c)-P(n+1, a).

For example, as described above, as shown in FIG. 12, five trajectory list candidates are added. In this case, like P(n, b)-P(n+2, a) and P(n, c)-P(n+2, a), the frames corresponding to respective two elements included in the trajectory list candidate and associated with each other may not be consecutive. However, for example, a candidate ball position separated from a frame corresponding to the last element of a trajectory list candidate by a predetermined number of frames (for example, four frames) or more may be excluded from candidate ball positions to be associated with this trajectory list candidate.

As described above, in the first embodiment, a plurality of trajectory list candidates are identified. After that, from those trajectory list candidates, a trajectory list candidate having the largest number of elements (candidate ball positions) included in the trajectory list candidate is identified as a trajectory list. A candidate ball position being an element included in the identified trajectory list is hereinafter referred to as "trajectory ball position."

In this case, for example, the trajectory list may be identified in accordance with another criterion. For example, a trajectory list candidate representing a trajectory closest to a straight line may be identified as the trajectory list.

The trajectory ball positions are generally identified for approximately 50 frames immediately after the impact as described above, but the trajectory ball positions are not identified for all frames up to the landing point.

After that, the ball trajectory identifying module 78 executes, for example, a straight line estimation based on the trajectory ball position in each frame identified as described above, to thereby identify a trajectory of the ball expressed in the image two-dimensional coordinate system of the captured moving image.

After that, a frame number corresponding to a timing at which the position in the up-and-down direction is at a predetermined position in a frame image is identified as a frame number corresponding to the timing of the impact by extending downward the identified trajectory for extrapolation. In the first embodiment, for example, the frame number is identified in a unit finer than the integer such as "103.195." A frame corresponding to the frame number identified as described above is hereinafter referred to as "impact frame."

After that, the ball trajectory identifying module 78 identifies a position (hereinafter referred to as "initial position") of the ball before the shot. For example, the ball trajectory identifying module 78 identifies frame images in frames immediately before and immediately after the impact frame. For example, when the frame number of the impact frame is "103.195," a frame having a frame number of 103 corresponds to the frame immediately before the impact frame, and a frame having a frame number 104 corresponds to the frame immediately after the impact frame. After that, in this case, a frame image (103) is identified as the frame image in the frame immediately before the impact frame. Moreover, a frame image (104) is identified as the frame image in the frame immediately after the impact frame.

After that, the ball trajectory identifying module 78 compares those two frame images with each other to detect an object which exists in the frame image immediately before the impact and does not exist in the frame image immediately after the impact. After that, the ball trajectory identifying module 78 identifies a position of the detected object as the initial position.

When the initial position cannot be identified in the manner above, the ball trajectory identifying module 78 may detect a shaft from a frame image of a frame (for example, fifth frame) at a time of making an address. After that, the ball trajectory identifying module 78 may identify, as the initial position, a position of an intersection between a line obtained by extending the detected shaft and a line which is at a position above the lower edge of the player region 96 by 10% of the length in the up-and-down direction of the player region 96 and extends in the left-and-right direction.

When the trajectory ball position is identified based on the comparison result image, the initial position being a position of the ball which is in a placed state and does not move does not form change pixels, and cannot thus be detected. Moreover, the ball is highly likely to be hidden by the clubhead before the shot. Even under this state, the initial position can be identified as described above in the first embodiment.

In the first embodiment, the flight distance calculation module 80 calculates, for example, the head speed, the ball speed, and the flight distance of the shot of the player 40.

Figure 13:
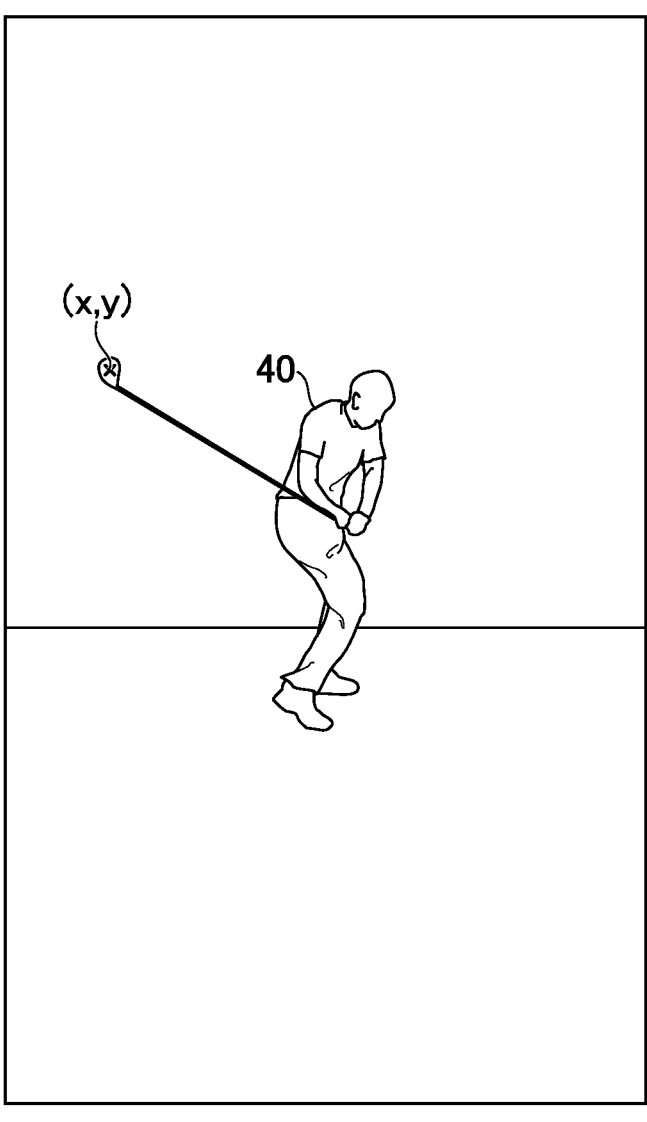
FIG. 13 is a view for illustrating an example of a top-position frame image.
Figure 14:
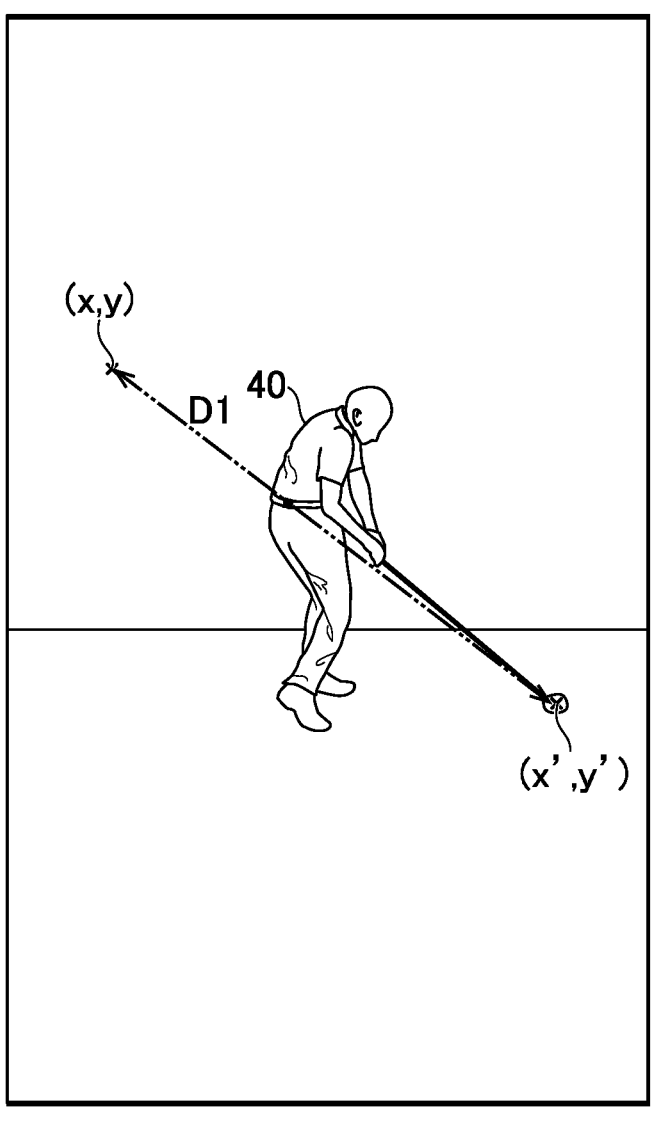
FIG. 14 is a view for illustrating an example of an impact frame image.

The flight distance calculation module 80, for example, first extracts, from the frame images included in the captured moving image, a top-position frame image in which the clubhead appears at the left most position and an impact frame image in which the clubhead appears at the right most position. FIG. 13 is a view for illustrating an example of the top-position frame image. FIG. 14 is a view for illustrating an example of the impact frame image.

After that, the flight distance calculation module 80 identifies coordinate values (x, y) of the clubhead in the top-position frame image and coordinate values (x', y') of the clubhead in the impact frame image, which are expressed in the two-dimensional image coordinate system of the frame image. Then, the flight distance calculation module 80 calculates an intra-image head movement distance D1 based on the coordinate values (x, y) and the coordinate values (x', y'). D1 is, for example, a square root of a sum of a square of (x'−x) and a square of (y'−y). In the frame image, it is assumed that the right direction is a positive direction of an "x" axis, and the down direction is a positive direction of a "y" axis.

After that, the flight distance calculation module 80 calculates, as a head movement period T1 (seconds), a value obtained by multiplying a difference between a frame number of the impact frame and a frame number of the top-position frame image by an image capture time interval (for example, 1/60 second).

After that, the flight distance calculation module 80 calculates, as a head speed S (meter per second), a value obtained by dividing the value D1 by the value T1.

After that, the flight distance calculation module 80 calculates, as a tentative ball initial speed V (meter per second), a value obtained by multiplying the head speed S by a tentative smash factor of 1.25.

After that, the flight distance calculation module 80 calculates, as a tentative total flight distance D2 (yards), a value obtained by multiplying the tentative ball initial speed V by a predetermined coefficient "4×0.833 1.0936."

After that, the flight distance calculation module 80 identifies, for each frame image, an up-and-down angle and a left-and-right angle in a camera coordinate system in this frame based on the coordinate values of the trajectory ball position in this frame image expressed in the two-dimensional coordinate system of the frame image. It is assumed that the coordinate values of the trajectory ball position for the frame image (n) are expressed as (x1(n), y1(n)), the up-and-down angle in the camera coordinate system in the frame corresponding to the frame image (n) is expressed as a1($n$), and the left-and-right angle is expressed as a2($n$). In this case, the up-and-down angle in the camera coordinate system refers to an angle in the up-and-down direction as the ball is viewed from the camera unit 28 while a predetermined direction is set as a reference. The left-and-right angle refers to an angle in the left-and-right direction as the ball is viewed from the camera unit 28 while a predetermined direction is set as a reference.

In the first embodiment, the position and the inclination of the user terminal 10 are adjusted as described above, and hence the two-dimensional coordinate values of the ball position can be associated with the up-and-down angle and the left-and-right angle in a one-to-one manner. Accordingly, in the first embodiment, for example, the up-and-down angle and the left-and-right angle can uniquely be identified based on the two-dimensional coordinate values of the ball position by referring to data indicating a conversion equation or a conversion table held in advance by the flight distance calculation module 80.

Moreover, the flight distance calculation module 80 similarly identifies, based on coordinate values (x0, y0) of the initial position of the ball, an up-and-down angle a1' and a left-and-right angle a2' at the time when the ball at the initial position is viewed from the camera unit 28.

After that, the flight distance calculation module 80 identifies a parabola indicating the trajectory of the ball associated with the tentative total flight distance D2 in the three-dimensional space based on this calculated tentative flight distance D2. In the first embodiment, it is assumed that the tentative total flight distance D2 and a shape of the parabola are associated with each other in advance. Then, the flight distance calculation module 80 calculates three-dimensional coordinate values of the position of the ball along this parabola corresponding to the up-and-down angle and the left-and-right angle in the three-dimensional space. In this case, for example, it is assumed that three-dimensional coordinate values (x2(n), y2(n), z2(n)) are calculated based on the parabola, the up-and-down angle a1($n$), and the left-and-right angle a2($n$) for the frame corresponding to the frame image (n).

In the first embodiment, for example, the three-dimensional coordinate values of the position of the ball are calculated for each frame while a set of three-dimensional coordinates values corresponding to the up-and-down angle a1' and the left-and-right angle a2' for the initial position of the ball is assumed as an origin.

Also in this case, the position and the inclination of the user terminal 10 are adjusted, and hence a combination of the parabola, the up-and-down angle, and the left-and-right angle can be associated with the three-dimensional coordinate values of the position of the ball in a one-to-one manner. Accordingly, in the first embodiment, for example, the three-dimensional coordinate values of the position of the ball can uniquely be identified based on the parabola, the up-and-down angle, and the left-and-right angle by referring to data indicating a conversion equation or a conversion table held in advance by the flight distance calculation module 80.

After that, the flight distance calculation module 80 solves an equation with two unknowns which has, as inputs, two of the three-dimensional coordinate values of the ball position calculated as described above, and has, as unknowns, a left-and-right angle and an elevation angle, to thereby calculate the left-and-right angle and the elevation angle corresponding to the inputs.

The flight distance calculation module 80 selects the pair of input three-dimensional coordinate values in various patterns, and calculates a combination of a value of the left-and-right angle and a value of the elevation angle for each pattern. After that, the flight distance calculation module 80 determines, as an elevation angle a3 of an overall flight trajectory of the ball, an average value of the values of the elevation angle calculated for the various patterns.

After that, the flight distance calculation module 80 calculates, for each frame, a left-and-right angle at the time when the calculated elevation angle a3 is considered as a fixed value based on the three-dimensional coordinate values of the position of the ball.

Figure 15:
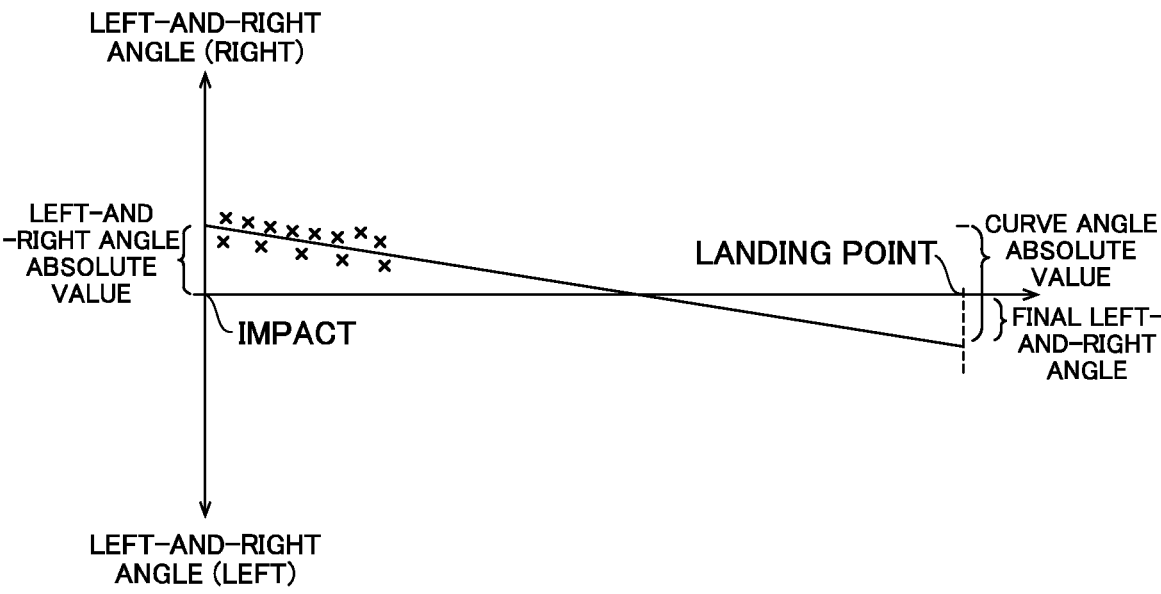
FIG. 15 is an explanatory graph for showing an example of a left-and-right angle absolute value and a curve angle absolute value.

After that, as shown in FIG. 15, the flight distance calculation module 80 uses regression analysis to calculate an initial value and a final value (a left-and-right angle at the time of the landing of the ball) of the left-and-right angle. In this case, for example, a left-and-right angle at the time of the impact is calculated as the initial value of the left-and-right angle. Then, the left-and-right angle at a position of the landing point identified based on the above-mentioned parabola is calculated as the final value of the left-and-right angle.

After that, the flight distance calculation module 80 calculates the smash factor based on a numerical expression "1.33×(1−0.01×(elevation angle deviation))×cos((left-and-right angle absolute value)+(curve angle absolute value))."

In this expression, the elevation angle deviation refers to an absolute value between the calculated elevation angle a3 and a value of 14. Moreover, the left-and-right angle absolute value refers to an absolute value of the value calculated as the initial value of the left-and-right angle. Further, the curve angle absolute value refers to an absolute value of a value obtained by subtracting the value calculated as the initial value of the left-and-right angle from the value calculated as the final value of the left-and-right angle.

After that, the flight distance calculation module 80 multiplies the smash factor calculated as described above by the calculated head speed S, to thereby calculate a ball initial speed.

After that, the flight distance (yards) is calculated by multiplying the calculated ball initial speed by 4×0.8×1.0936.

The method of calculating the flight distance and the like is not limited to the above-mentioned method.

In the first embodiment, the clubhead trajectory identifying module 82 identifies a trajectory of the clubhead appearing in the captured moving image based on, for example, this captured moving image.

Figure 16:
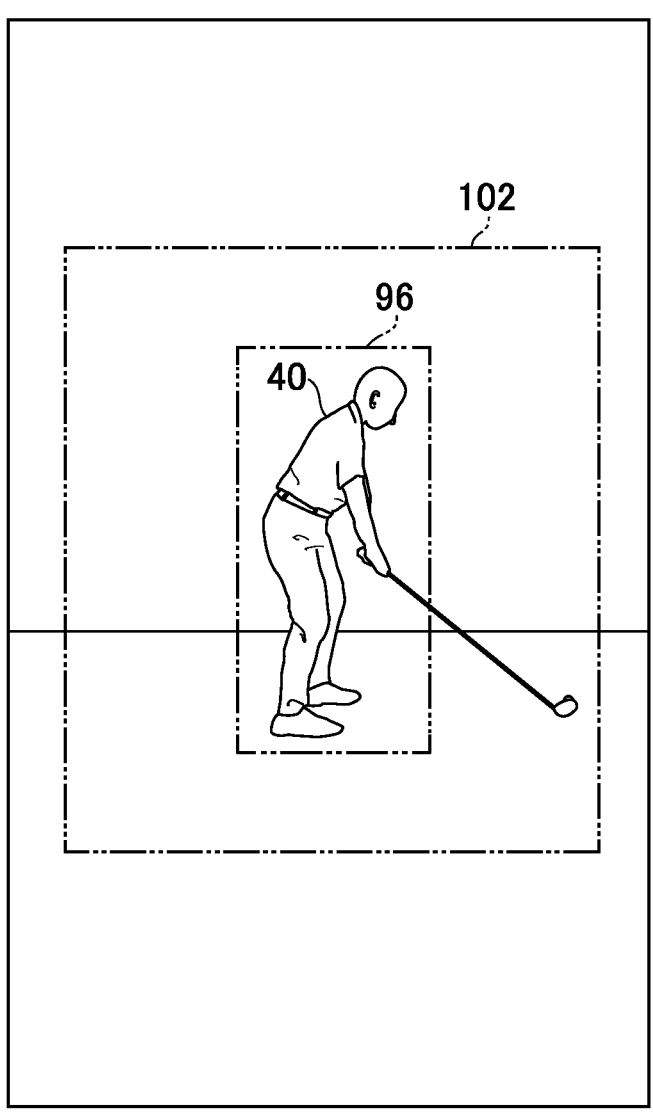
FIG. 16 is a view for illustrating an example of a head detection region.

The clubhead trajectory identifying module 82 first identifies, for example, a head detection region 102 of FIG. 16. In this case, a position, a shape, and a size of the head detection region 102 are uniquely identified based on the position, the shape, and the size of the player region 96 in accordance with, for example, a rule defined in advance. In the example of FIG. 16, a region having the same center position as the center position of the player region 96, having a length in the left-and-right direction three times as long as that of the player region 96, and having a length in the up-and-down direction twice as long as that of the player region 96 is indicated as the head detection region 102.

After that, the clubhead trajectory identifying module 82 identifies a position at which the clubhead appears in the head detection region 102 in each of the plurality of frame images included in the captured moving image. In this case, for example, for each of frame images up to the impact frame, a region of the frame image in which the clubhead appears may be identified. For the identification of the region in which the clubhead appears, the above-mentioned comparison result image may be used. For example, a region which is in the head detection region 102 and corresponds to a pixel block of change pixels being a range of a predetermined number of pixels may be identified as the region showing the clubhead. Then, the clubhead trajectory identifying module 82 may identify, for each identified region, as a position (hereinafter referred to as "clubhead position") at which the clubhead appears, a position of a representative point (for example, center) of the identified region.

After that, the clubhead trajectory identifying module 82 may identify the trajectory of the clubhead based on a plurality of identified clubhead positions. For example, the clubhead trajectory identifying module 82 may use a three-dimensional Bezier curve calculation to interpolate the clubhead positions each identified in each frame, to thereby identify, as the trajectory of the clubhead, a movement trajectory L1 of the clubhead having a smooth line form which is exemplified in FIG. 17 and has the interpolated intervals between the frames.

Moreover, the clubhead trajectory identifying module 82 may identify a movement direction of the clubhead at the time of the impact based on the captured moving image. For example, the clubhead trajectory identifying module 82 may identify a position of the clubhead in the frame immediately before the impact frame on the movement trajectory L1 of the clubhead identified as described above. Further, the clubhead trajectory identifying module 82 may identify a position of the clubhead in the frame immediately after the impact frame on the movement trajectory L1 of the clubhead identified as described above.

Figure 17:
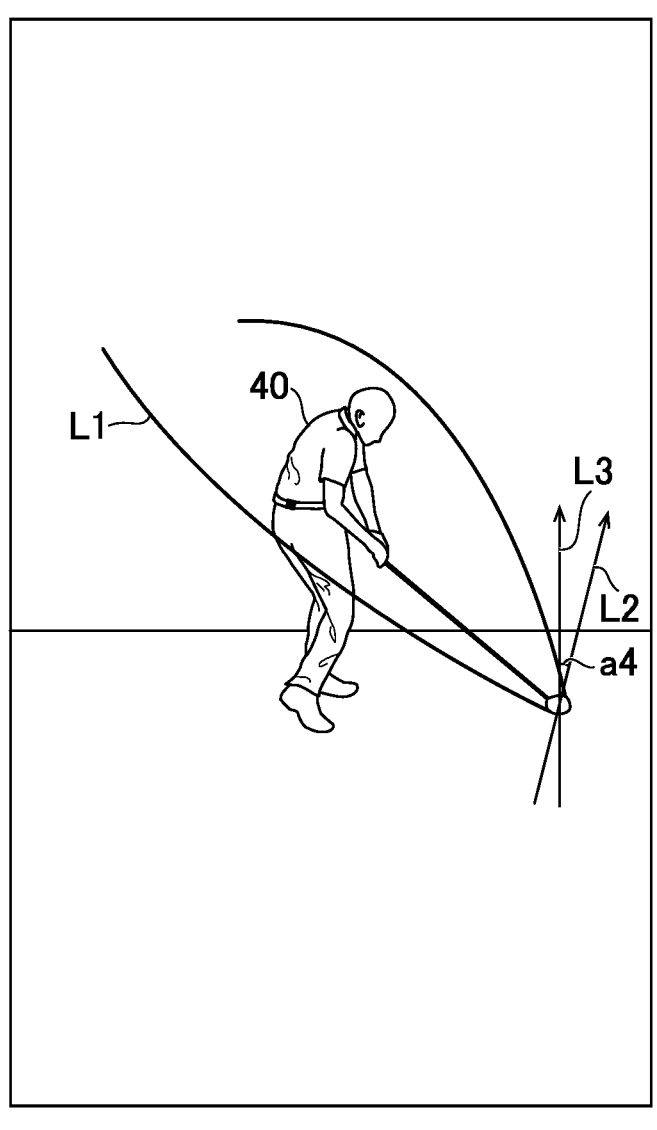
FIG. 17 is a view for illustrating an example of a club path angle.

The clubhead trajectory identifying module 82 may identify a line L2 which is exemplified in FIG. 17 and connects between the position of the clubhead in the frame immediately before the impact frame and the position of the clubhead in the frame immediately after the impact frame.

The clubhead trajectory identifying module 82 may identify an angle of the movement direction of the clubhead at the time of the impact expressed in the two-dimensional image coordinate system of the captured moving image with respect to a predetermined reference direction. As illustrated in FIG. 17, for example, the clubhead trajectory identifying module 82 may identify, as an angle a4 of the movement direction of the clubhead at the time of the impact, an angle formed between a line L3 extending in the up-and-down direction in the frame image and the above-mentioned line L2 along the movement direction of the clubhead. The angle of the movement direction of the clubhead at the time of the impact identified as described above is hereinafter referred to as "club path angle." In the first embodiment, the club path angle is positive in the counterclockwise direction. That is, a value of the club path angle a4 of FIG. 17 is negative.

In the first embodiment, the launch direction identifying module 84 identifies a launch direction of the ball appearing in the captured moving image based on, for example, this captured moving image.

The launch direction identifying module 84 identifies the launch direction based on, for example, positions at which the ball appears in a plurality of frame images included in the captured moving image. In this case, the launch direction identifying module 84 may identify the launch direction based on, for example, the trajectory of the ball identified by the ball trajectory identifying module 78. For example, the launch direction may be identified based on the trajectory ball positions in frame images of a predetermined number of frames (for example, five frames) immediately after the impact frame identified by the ball trajectory identifying module 78. For example, the direction of an approximate straight line L4 which is exemplified in FIG. 18 and is along the trajectory ball positions in the frame images of the predetermined number of frames immediately after the impact frame may be identified as the launch direction.

Figure 18:
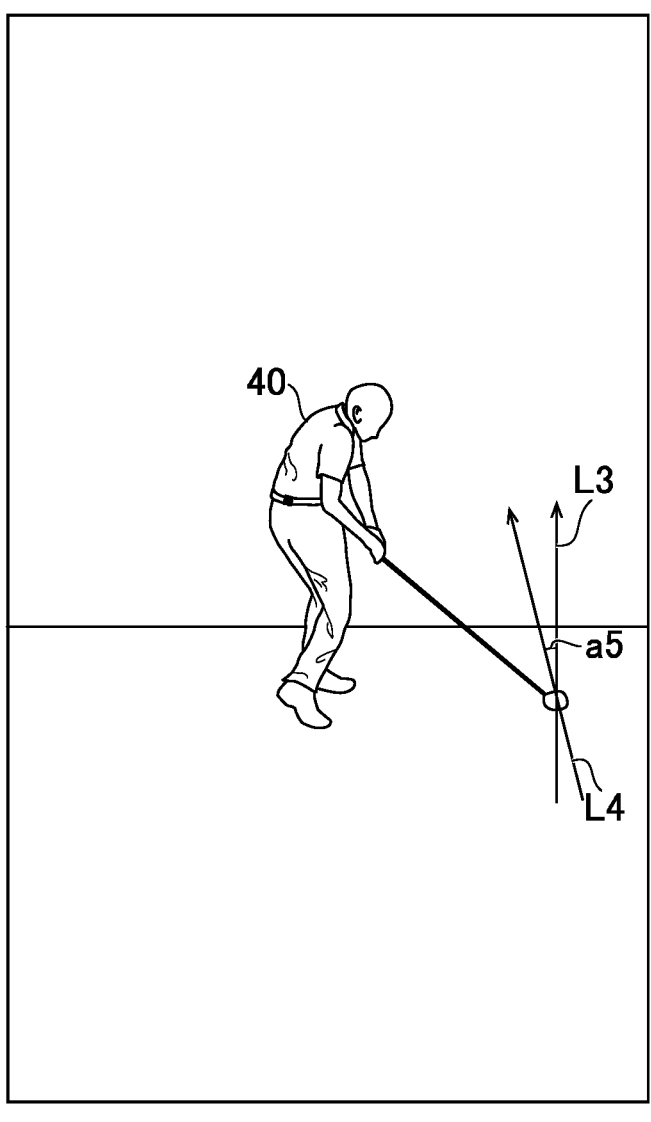
FIG. 18 is a view for illustrating an example of a launch angle.

Moreover, the launch direction identifying module 84 may identify an angle of a launch direction with respect to a predetermined reference direction expressed in the two-dimensional image coordinate system of the captured moving image. For example, as illustrated in FIG. 18, an angle formed between a line L3 extending in the up-and-down direction in the frame image and the line L4 along the launch direction may be identified as a launch angle a5. In the first embodiment, the launch angle is positive in the counter-clockwise direction. That is, a value of the launch angle a5 of FIG. 18 is positive.

After that, the launch direction identifying module 84 identifies the direction of the face of the club at the time of the impact based on the identified launch direction.

For example, when an absolute value of the launch angle a5 is smaller than a predetermined value, the direction of the face may be identified as square. Moreover, when the absolute value of the launch angle a5 is equal to or larger than the predetermined value, and the value of the launch angle a5 is positive, the direction of the face may be identified as closed. Further, when the absolute value of the launch angle a5 is equal to or larger than the predetermined value, and the value of the launch angle a5 is negative, the direction of the face may be identified as open.

In the first embodiment, the swing trajectory type specifying module 86 specifies, for example, a type of a swing trajectory of the player 40. In this case, the swing trajectory type specifying module 86 specifies, for example, which of the inside-out swing trajectory, the inside-in swing trajectory, and the outside-in swing trajectory the swing trajectory of the swing of the player 40 is.

The swing trajectory type specifying module 86 may specify the type of the swing trajectory based on, for example, the above-mentioned club path angle a4.

For example, when an absolute value of the club path angle a4 is smaller than a predetermined value, the type of the swing trajectory may be specified as the inside-in swing trajectory. Moreover, when the absolute value of the club path angle a4 is equal to or larger than the predetermined value, and the value of the club path angle a4 is a positive value, the type of the swing trajectory may be specified as the outside-in swing trajectory. Further, when the absolute value of the club path angle a4 is equal to or larger than the predetermined value, and the value of the club path angle a4 is negative, the type of the swing trajectory may be specified as the inside-out swing trajectory.

The method of specifying the type of the swing trajectory by the swing trajectory type specifying module 86 is not limited to the above-mentioned method.

For example, the swing trajectory type specifying module 86 may identify a position of a predetermined portion of the body of the player 40 appearing in the frame image at the time of making the address based on the captured moving image. In this case, for example, the swing trajectory type specifying module 86 may identify the position of the predetermined portion of the body of the player 40 appearing in a frame image having a predetermined number (for example, the frame image (5)). In this case, for example, a position of the shoulders of the player 40 represented in the skeleton model 98 identified by the player region identifying module 72 may be identified.

Figure 19:
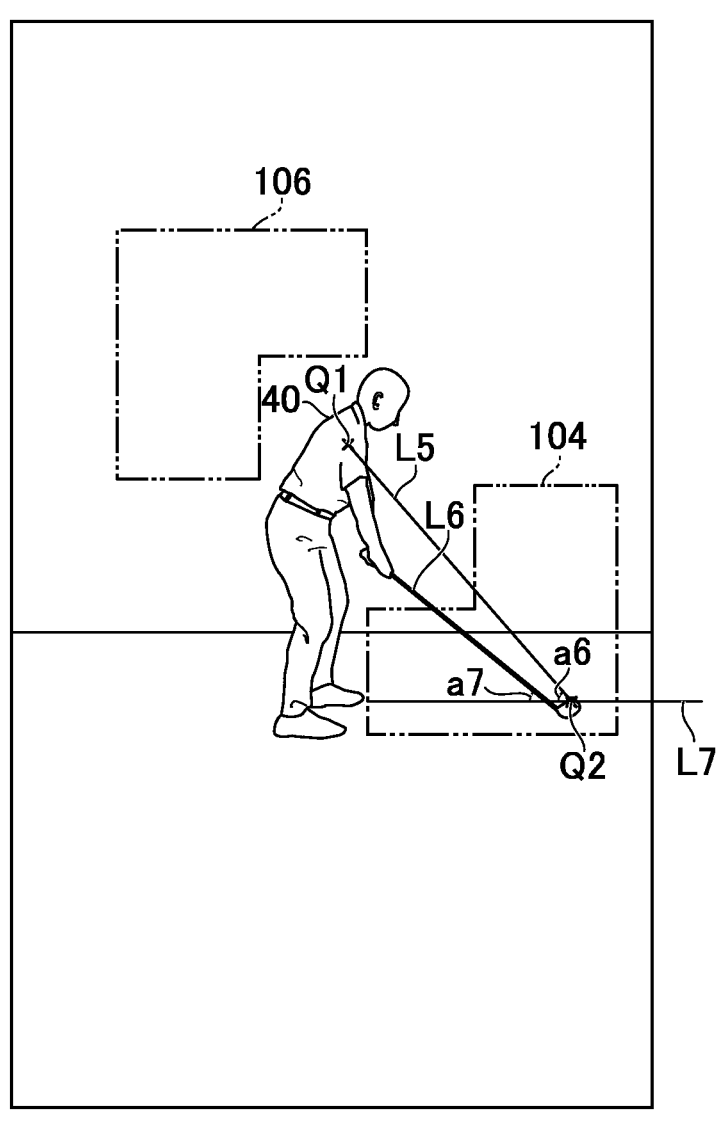
FIG. 19 is a view for illustrating an example of reference angles.

After that, as illustrated in FIG. 19, the swing trajectory type specifying module 86 may identify a line L5 which connects between a identified position Q1 of the shoulders and an initial position Q2 identified by the ball trajectory identifying module 78.

Moreover, as illustrated in FIG. 19, the swing trajectory type specifying module 86 may identify a line L6 along the shaft appearing in the frame image.

The swing trajectory type specifying module 86 may identify an address-time shaft detection region 104 and a backswing-time shaft detection region 106 of FIG. 19. In this case, the address-time shaft detection region 104 may be, for example, a region which has a position and a size uniquely identified based on, for example, the player region 96, and is positioned on a right lower side of the player region 96. Moreover, the backswing-time shaft detection region 106 may be a region which has a position and a size uniquely identified based on, for example, the player region 96, and is positioned on a left upper side of the player region 96.

After that, the swing trajectory type specifying module 86 may specify, as a backswing-time frame image, a frame image in which the shaft is detected in the backswing-time shaft detection region 106. After that, the swing trajectory type specifying module 86 may generate a shaft detection image representing a difference between each of the pixel values in the frame image at the time of making the address and each of the pixel values in the frame image at the time of the backswing for each pixel corresponding to each other in the address-time shaft detection region 104. In place of the frame image at the time of the backswing specified as described above, the above-mentioned top-position frame image may be used.

After that, the swing trajectory type specifying module 86 may apply a line detection method such as the Hough transform to the generated shaft detection image, to thereby identify the line L6 along the shaft.

After that, the swing trajectory type specifying module 86 may identify at least one reference angle based on at least one of the position of the predetermined portion of the body of the player 40 at the time of making the address or the position of the shaft at the time of making the address identified based on the captured moving image.

The swing trajectory type specifying module 86 may identify a first reference angle based on, for example, the position of the predetermined portion of the body. Moreover, the swing trajectory type specifying module 86 may identify the first reference angle based on the position of the predetermined portion of the body and the position of the ball before the swing.

For example, as illustrated in FIG. 19, the swing trajectory type specifying module 86 may identify, as a first reference angle a6, an angle formed between the line L7 extending in the left-and-right direction and the line L5 connecting between the position Q1 of the shoulders and the initial position Q2 in the frame image.

Moreover, the swing trajectory type specifying module 86 may identify a second reference angle based on, for example, the position of the shaft at the time of making the address.

As illustrated in FIG. 19, the swing trajectory type specifying module 86 may identify, as a second reference angle a7, for example, an angle formed between the line L7 extending in the left-and-right direction and the line L6 along the shaft in the frame image.

As described above, the reference angles expressed in the two-dimensional coordinate system of the captured moving image may be identified.

Moreover, the swing trajectory type specifying module 86 may identify a downswing angle of the clubhead appearing in the captured moving image based on the captured moving image. For example, the swing trajectory type specifying module 86 may identify the downswing angle based on, for example, the frame images of a predetermined number of frames before the impact.

For example, it is assumed that the frame number of the frame immediately after the impact is "m". In this case, for four frames of from an (m-5)th frame to an (m-2)th frame, the position of the clubhead on the movement trajectory L1 of the clubhead identified as described above may be identified. After that, a line representing a movement direction obtained by averaging a movement direction of the clubhead from the (m-5)th frame to the (m-4)th frame, a movement direction of the clubhead from the (m-4)th frame to the (m-3)th frame, and a movement direction of the clubhead from the (m-3)th frame to the (m-2)th frame may be identified as a line L8 along the downswing direction exemplified in FIG. 20.

Figure 20:
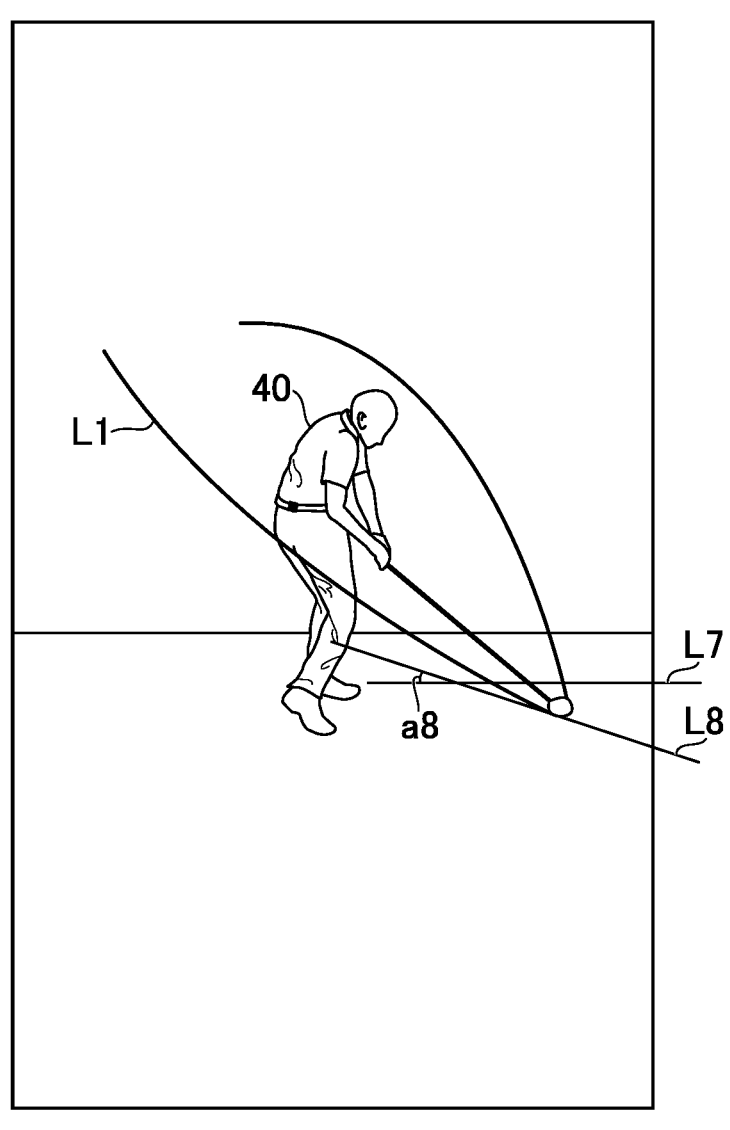
FIG. 20 is a view for illustrating a downswing angle.

As another example, an approximate straight line along the positions of the clubhead in four frames of from an (m-5)th frame to the (m-2)th frame may be identified as the line L8 along the downswing direction exemplified in FIG. 20. The frames to be used to identify the line L8 are not limited to the four frames of from the (m-5)th frame to the (m-2)th frame.

After that, as illustrated in FIG. 20, the swing trajectory type specifying module 86 may identify, as a downswing angle a8, an angle formed between the line L7 extending in the left-and-right direction in the frame image and the line L8 along the above-mentioned downswing direction.

As described above, the downswing angle expressed in the two-dimensional coordinate system of the captured moving image may be identified.

After that, the swing trajectory type specifying module 86 may compare the above-mentioned reference angles and the above-mentioned downswing angle with each other. Then, the swing trajectory type specifying module 86 may specify the type of the swing trajectory of the swing based on a result of the comparison between the reference angles and the downswing angle. For example, the swing trajectory type specifying module 86 may specify which of the inside-out swing trajectory, the inside-in trajectory, and the outside-in trajectory the swing trajectory of the swing is based on the first reference angle, the second reference angle, and the downswing angle.

For example, when the value of the downswing angle a8 is larger than the first reference angle a6, the type of the swing trajectory may be specified as the outside-in swing trajectory. This case corresponds to a state in which the club is swung down from an outside (upper side) of the so-called V zone.

Moreover, when the value of the downswing angle a8 is equal to or larger than the second reference angle a7, and is equal to or smaller than the first reference angle a6, the type of the swing trajectory may be specified as the inside-in swing trajectory. This case corresponds to a state in which the swing trajectory falls within the so-called V zone.

Further, when the value of the downswing angle a8 is smaller than the second reference angle a7, the type of the swing trajectory may be specified as the inside-out swing trajectory. This case corresponds to a state in which the club is swung down from an inside (lower side) of the so-called V zone.

In the first embodiment, the curve direction determination module 88 determines a curve direction of the launched ball based on, for example, the trajectory of the clubhead identified as described above and the launch direction identified as described above. The curve direction determination module 88 may determine the curve direction based on the movement direction of the clubhead and the launch direction.

The curve direction determination module 88 determines the curve direction of the ball based on, for example, a difference between the signed club path angle a4 and the signed launch angle a5. For example, when the difference between the value of the signed club path angle a4 and the value of the signed launch angle a5 is smaller than a predetermined value, the ball is determined not to curve (to fly straight). Moreover, for example, when the difference between the value of the signed club path angle a4 and the value of the signed launch angle a5 is equal to or larger than the predetermined value, and the value of the signed launch angle a5 is larger than the value of the signed club path angle a4, the ball is determined to curve left. Further, when the difference between the value of the signed club path angle a4 and the value of the signed launch angle a5 is equal to or larger than the predetermined value, and the value of the signed launch angle a5 is smaller than the value of the signed club path angle a4, the ball is determined to curve right.

Moreover, the curve direction determination module 88 may determine the curve direction and a magnitude of the curve of the launched ball based on the trajectory of the clubhead and the launch direction. For example, an absolute value of the difference between the value of the signed club path angle a4 and the value of the signed launch angle a5 may be identified as a curve value indicating the magnitude of the curve. Further, for example, a curve evaluation value used to evaluate the magnitude of the curve at several levels (for example, three levels), such as "large," "medium," and "small," may be determined based on a magnitude of the absolute value of the difference between the value of the signed club path angle a4 and the value of the signed launch angle a5.

In the first embodiment, the analyzed moving image generation module 90 generates, for example, an analyzed moving image formed by superimposing an image representing results of the swing analysis processing on the captured moving image.

The analyzed moving image generation module 90 may generate an analyzed moving image formed by superimposing an image expressing the direction of the face of the club at the time of the impact and the curve direction of the ball identified based on the trajectory of the clubhead and the launch direction on the captured moving image. For example, there may be generated an analyzed moving image formed by superimposing the impact image 48 of FIG. 2 on the frame image included in the captured moving image. In this case, the type of the swing trajectory specified by the swing trajectory type specifying module 86 may be expressed in the impact image 48 as the trajectory of the clubhead.

Figure 21:
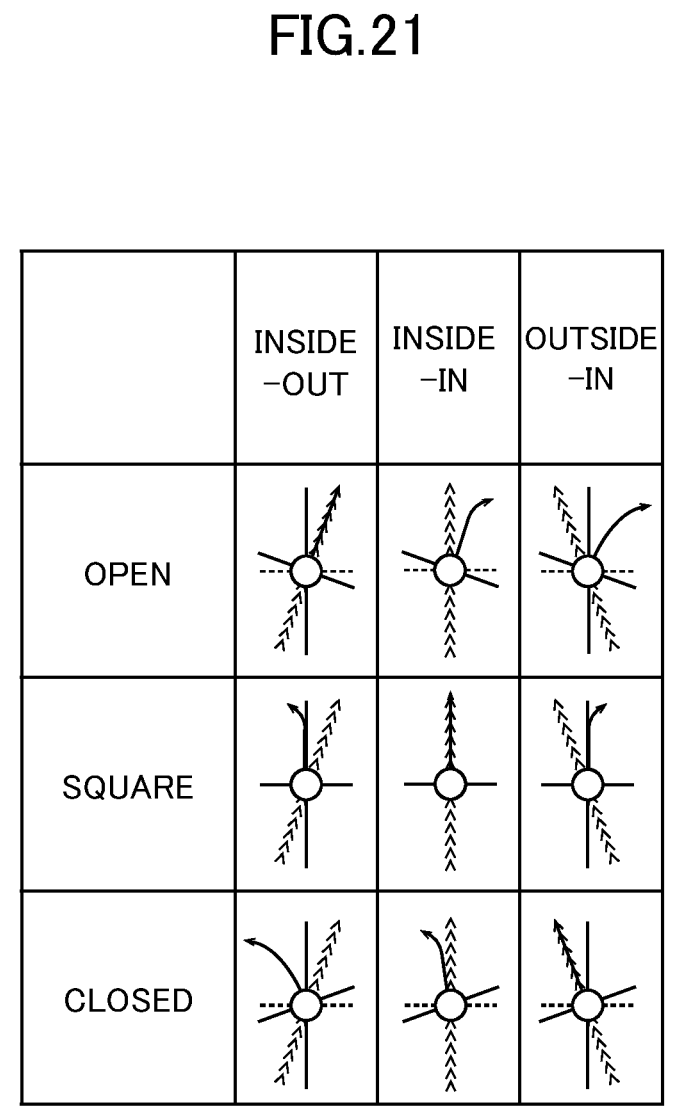

FIG. 21 is a table for showing an example of a variation of the impact image 48. In FIG. 21, nine types of impact images 48 corresponding to combinations between the types of the swing trajectories and the types of the directions of the face are shown.

In the impact images 48 of FIG. 21, the types of swing trajectories, directions of the face, and curve directions of the ball are reflected. In the impact images 48, not only the types of swing trajectories, directions of the face, and curve directions of the ball, but the magnitude may be reflected.

For example, a magnitude of an angle formed between the movement direction (direction along which the arrows are arranged) of the head indicated by the head movement direction image 50 and the up-and-down direction may correspond to the magnitude of the above-mentioned club path angle a4. In this case, it is not required that the magnitude of the angle formed between the movement direction of the head indicated by the head movement direction image 50 and the up-and-down direction be the same as the magnitude of the above-mentioned club path angle a4. For example, the angle formed between the movement direction of the head indicated by the head movement direction image 50 and the up-and-down direction may be an angle determined based on the club path angle a4 in accordance with a predetermined conversion rule.

Moreover, for example, the angle formed between the movement direction of the head indicated by the head movement direction image 50 and the up-and-down direction may be a magnitude determined from several levels of a magnitude of an angle based on the magnitude of the above-mentioned club path angle a4.

Further, for example, a magnitude of an angle formed between the extension direction of the face direction image 52 having the line form of FIG. 2 and the left-and-right direction may correspond to the above-mentioned launch angle a5. In this case, the angle formed between the extension direction of the face direction image 52 and the left-and-right direction is not required to be the same as the magnitude of the above-mentioned launch angle a5. For example, the angle formed between the extension direction of the face direction image 52 and the left-and-right direction may be an angle determined based on the launch angle a5 in accordance with a predetermined conversion rule.

Moreover, for example, the angle formed between the extension direction of the face direction image 52 having the line form and the left-and-right direction may be a magnitude determined from several levels of a magnitude of an angle based on the magnitude of the above-mentioned launch angle a5.

Moreover, the magnitude of the curve of the ball direction image 54 may correspond to a magnitude of an absolute value of a difference between the value of the club path angle a4 and the value of the launch angle a5. For example, as the absolute value of the difference between the value of the club path angle a4 and the value of the launch angle a5 increases, the curve of the ball direction image 54 may be expressed to be larger. Further, for example, the magnitude of the curve of the ball direction image 54 may correspond to the above-mentioned curve evaluation value.

Moreover, the analyzed moving image generation module 90 may generate an analyzed moving image formed by superimposing lines indicating the above-mentioned reference angles on the captured moving image. For example, the analyzed moving image generation module 90 may generate an analyzed moving image formed by superimposing lines indicating the above-mentioned first reference angle and lines indicating the above-mentioned second reference angle on the captured moving image. For example, an analyzed moving image formed by superimposing the V zone image 56 of FIG. 2 on the frame image included in the captured moving image may be generated. As illustrated in FIG. 2, the V zone image 56 is a triangular image, an upper edge thereof corresponds to the line L5 of FIG. 19, and a lower edge thereof corresponds to the line L6 of FIG. 19. In this case, for example, the V zone image 56 may be arranged in the frame image so that the upper edge and the lower edge of the V zone image 56 pass through the above-mentioned initial position.

Moreover, as illustrated in FIG. 2, on the analyzed moving image, the clubhead trajectory effect image 42 having a belt shape corresponding to the trajectory of the clubhead identified as described above may be superimposed. Further, on the analyzed moving image, the ball trajectory effect image 44 having a belt shape corresponding to the trajectory of the ball identified as described above may be superimposed.

Moreover, as illustrated in FIG. 2, in the analyzed moving image, the analysis result information 46 indicating the analysis results obtained by the above-mentioned swing analysis processing may be arranged. For example, the analysis result information 46 may include information indicating values (the ball initial speed, the flight distance, and the like) calculated by the flight distance calculation module 80 and information indicating the type of the swing trajectory specified by the swing trajectory type specifying module 86.

After that, in the first embodiment, the analyzed moving image generation module 90 stores the generated analyzed moving image in, for example, the analyzed moving image storage unit 92.

In the first embodiment, the analyzed moving image storage unit 92 stores, for example, the analyzed moving image generated by the analyzed moving image generation module 90.

The display control module 94 displays the analyzed moving image stored in the analyzed moving image storage unit 92 on the touch panel 26 in response to, for example, a request from the user of the user terminal 10. As described above, the display control module 94 may notify the user of a result of comparison between the above-mentioned reference angles and the above-mentioned downswing angle. For example, the display control module 94 may notify the user of the type of the swing trajectory specified based on the result of the comparison between the above-mentioned reference angles and the above-mentioned downswing angle.

Figure 22:
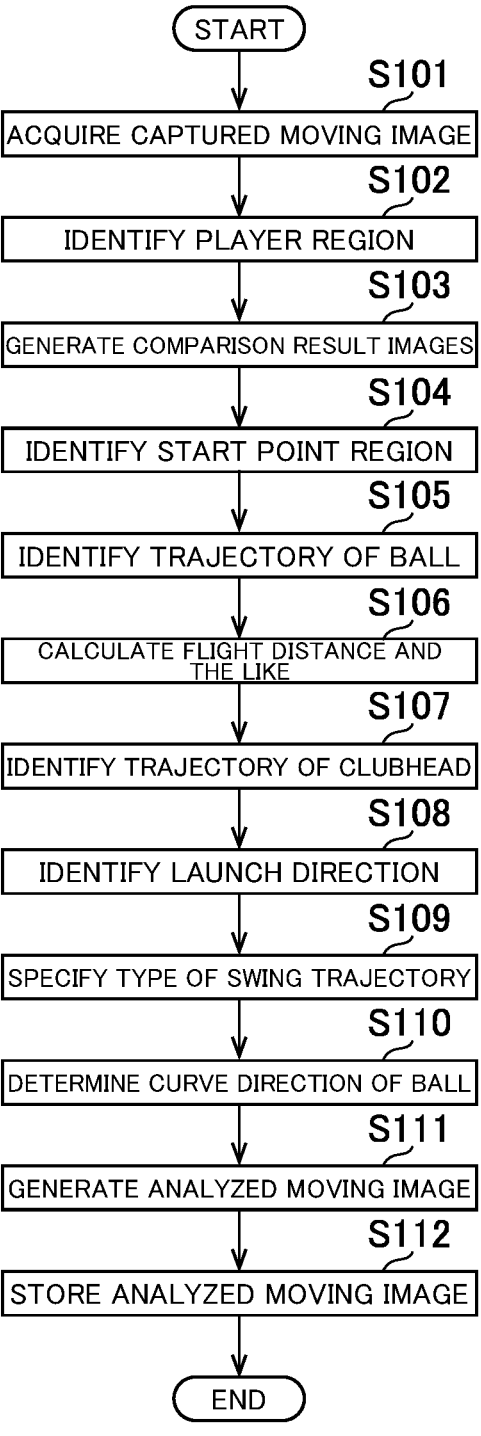
FIG. 22 is a flowchart for illustrating an example of a flow of processing executed in the user terminal in the at least one embodiment of the present invention.

With reference to a flowchart exemplified in FIG. 22, description is now given of an example of a flow of processing executed in the user terminal 10 in the first embodiment.

First, the captured moving image acquisition module 70 acquires the captured moving image (Step S101).

After that, the player region identifying module 72 identifies the player region 96 (Step S102).

After that, the comparison result image generation module 74 generates a plurality of comparison result images based on the captured moving image acquired in the processing step of Step S101 (Step S103).

After that, the start point region identifying module 76 identifies the start point region 100 based on the player region 96 identified in the processing step of Step S102 (Step S104).

After that, the ball trajectory identifying module 78 identifies the trajectory of the ball based on the comparison result images generated in the processing step of Step S103 (Step S105).

After that, the flight distance calculation module 80 calculates the flight distance of the shot and the like of the swing appearing in the captured moving image acquired in the processing step of Step S101 (Step S106).

After that, the clubhead trajectory identifying module 82 identifies the trajectory of the clubhead based on the captured moving image acquired in the processing step of Step S101 (Step S107).

After that, the launch direction identifying module 84 identifies the launch direction of the ball based on the trajectory of the ball identified in the processing step of Step S105 (Step S108).

After that, the swing trajectory type specifying module 86 specifies the type of the swing trajectory of the swing appearing in the captured moving image acquired in the processing step of Step S101 based on the trajectory of the clubhead identified in the processing step of Step S107 and the launch direction of the ball identified in the processing step of Step S108 (Step S109).

After that, the curve direction determination module 88 determines the curve direction of the ball in this shot based on the trajectory of the clubhead identified in the processing step of Step S107 and the launch direction of the ball identified in the processing step of Step S108 (Step S110).

After that, the analyzed moving image generation module 90 generates the analyzed moving image based on the captured moving image acquired in the processing step of Step S101 and the results of the processing steps of Step S105 to Step S110 (Step S111).

After that, the analyzed moving image generation module 90 stores, in the analyzed moving image storage unit 92, the analyzed moving image generated in the processing step of Step S111 (Step S112), and the process of this processing example is finished.

As described above, the swing trajectory type specifying module 86 may identify the downswing angle and the reference angles in the processing step of Step S109. After that, the swing trajectory type specifying module 86 may specify the type of the swing trajectory of the swing appearing in the captured moving image acquired in the processing step of Step S101 based on the identified downswing angle and reference angles.

In the first embodiment, the curve direction of the ball can appropriately be determined by only capturing the image of the player performing the swing of the golf without directly measuring the direction of the face. In this manner, according to the first embodiment, a general player can easily analyze the golf swing by using a smartphone or the like on a golf course or a golf driving range.

Moreover, in the first embodiment, the above-mentioned reference angles and the above-mentioned downswing angle are compared with each other by only capturing the image of the player performing the swing of the golf. As a result, according to the first embodiment, even a general player who does not have knowledge on the golf such as a range of an appropriate swing plane angle can easily grasp whether or not the player has made a correct swing by obtaining the comparison result between the reference angles and the downswing angle.

Moreover, in the first embodiment, as described above, the type of the swing trajectory of the swing is appropriately specified based on the above-mentioned reference angles and the above-mentioned downswing angle. Thus, according to the first embodiment, even a general player can easily grasp whether or not the swing has been executed on a correct swing trajectory by obtaining the type of his or her own swing trajectory.

In the first embodiment, it is not required to identify the first reference angle based on the position of the shoulders, and the first reference angle may be identified based on, for example, a position of the neck of the player 40.

Moreover, for example, it is not required to identify the above-mentioned first reference angle based on the initial position of the ball, and the first reference angle may be identified based on, for example, a position designated by the user or the position of the clubhead at the time of making the address.

Moreover, for example, it is not required to identify the second reference angle based on the position of the shaft, and the second reference angle may be identified based on, for example, a position of the waist of the player 40. For example, the above-mentioned second reference angle may be identified based on a line connecting between the position of the waist of the player 40 and the initial position of the ball or a line connecting between the position of the waist of the player 40 and the position of the clubhead at the time of making the address.

Moreover, it is not required to identify the two reference angles, and the type of the swing trajectory may be specified based on one reference angle. For example, it may be specified whether or not the type of the swing trajectory is the outside-in swing trajectory based on one reference angle. Further, for example, it may be specified whether or not the type of the swing trajectory is the inside-out swing trajectory based on one reference angle.

Moreover, all or a part of the processing of FIG. 3 may be implemented on a server which can communicate to and from the user terminal 10.

Second Embodiment

A second embodiment, which is another embodiment of the present invention, is now described in detail with reference to the drawings.

Figure 23:
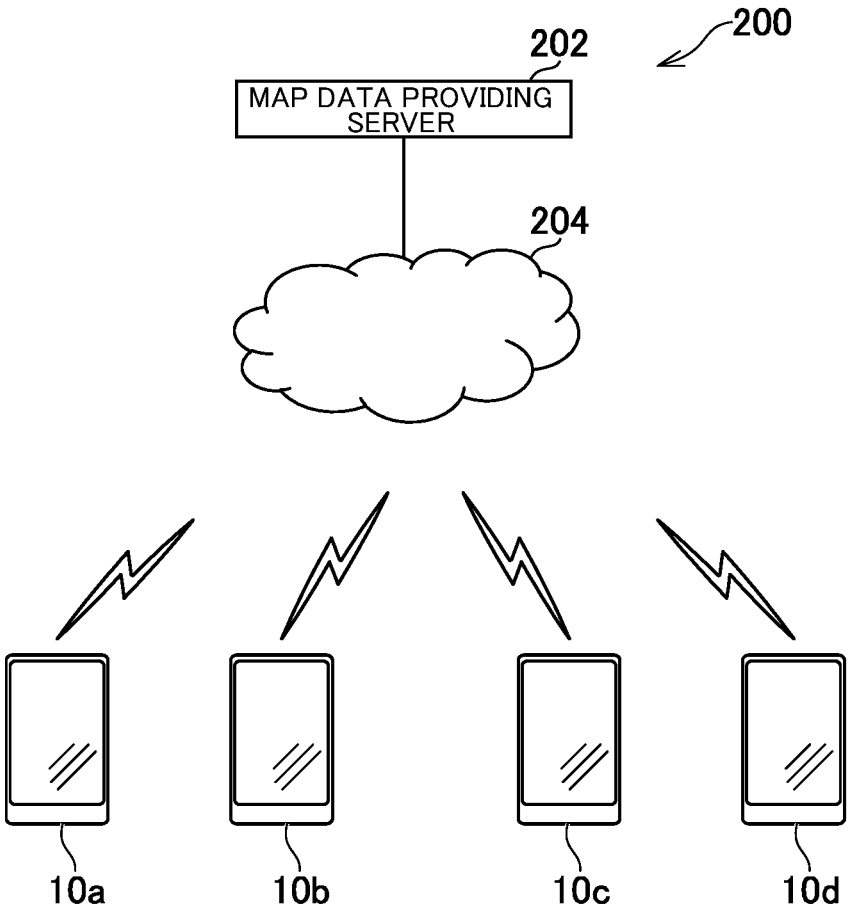
FIG. 23 is a diagram for illustrating an example of a configuration of a ball position sharing system in the at least one embodiment of the present invention.

FIG. 23 is a diagram for illustrating an example of a configuration of a ball position sharing system 200 in the second embodiment. The ball position sharing system 200 includes a map data providing server 202 and a plurality of user terminals 10.

As illustrated in FIG. 23, the ball position sharing system 200 may include four user terminals 10 (10*a*, 10*b*, 10*c*, and 10*d*) held by respective four players playing a round in the golf play on a golf course. The players holding the user terminals 10*a*, 10*b*, 10*c*, and 10*d* are hereinafter referred to as "player A," "player B," "player C," and "player D," respectively.

The configuration of the user terminal 10 in the second embodiment is the same as that of the user terminal 10 described in the first embodiment, and description thereof is therefore omitted.

In the second embodiment, the map data providing server 202 is a server which provides, for example, map data including images, such as aerial images, satellite images, and map images having a geographical position (for example, a latitude and a longitude) associated with each pixel.

The user terminals 10 and the map data providing server 202 are connected to a computer network 204 such as the Internet. Thus, through the computer network 204, the user terminals 10 and the map data providing server 202 can communicate to and from each other, and the user terminals 10 can also communicate to and from each other. The user terminals 10 may directly communicate to and from each other through near-field wireless communication such as Bluetooth (trademark) without the intermediation of the computer network 204.

In the second embodiment, for example, in the golf play on the golf course, a scene of the player shooting a golf ball is captured by the camera unit 28 included in the user terminal 10 as in the first embodiment. After that, the captured moving image in which the scene of the player shooting the golf ball appears is generated.

In the second embodiment, it is assumed that the position and the inclination of the user terminal 10 are adjusted so that the position of the player with respect to the position of the camera unit 28 is a predetermined position, and the direction of the player with respect to the capturing direction is a predetermined direction. In the second embodiment, it is assumed that the capturing direction is a direction along a horizontal plane.

Figure 24:
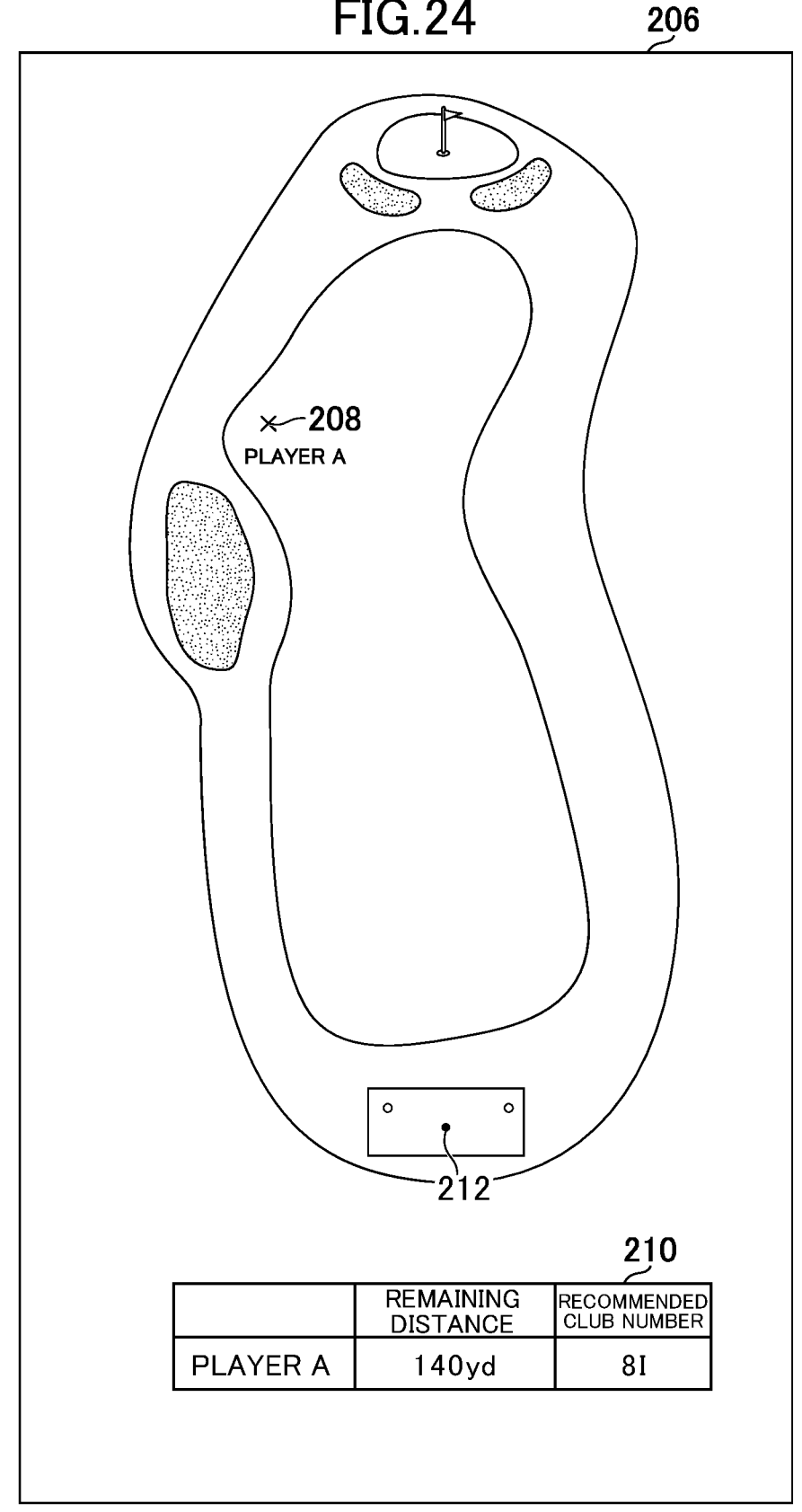
FIG. 24 is a view for illustrating an example of a hole image.

In the second embodiment, for example, a hole image 206 exemplified in FIG. 24 is generated based on the captured moving image. Then, the generated hole image 206 is displayed on the touch panel 26 included in this user terminal 10.

As illustrated in FIG. 24, the hole image 206 includes, for example, a ball position image 208, navigation information 210, and a terminal position image 212. The ball position image 208 is an image indicating, for example, a geographical position of the shot ball. As illustrated in FIG. 24, a character string indicating identification information on the player such as a name of the player who has performed a shot may be arranged in a vicinity of the ball position image 208.

The navigation information 210 includes, for example, character strings indicating information presented to the player, such as a remaining distance and a club number recommended to be used for a next shot.

The terminal position image 212 is an image indicating, for example, a geographical position of the user terminal 10 at the time when the captured moving image is taken.

Figure 25:
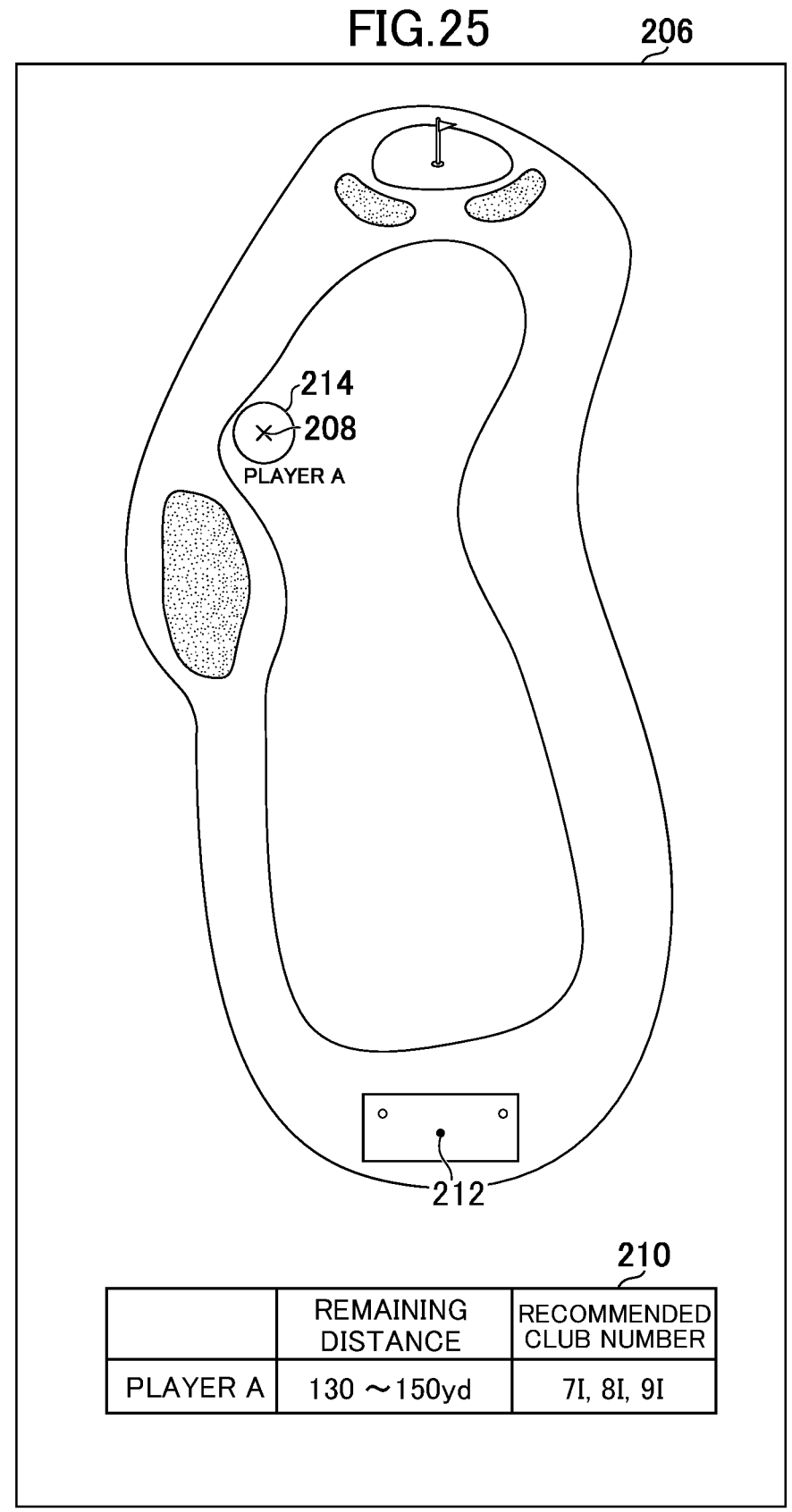
FIG. 25 is a view for illustrating an example of the hole image.

FIG. 25 is a view for illustrating another example of the hole image 206 in the second embodiment. As illustrated in FIG. 25, the hole image 206 may include a predicted range image 214 being an image corresponding to an accuracy of the geographical position of the ball indicated in the ball position image 208. The predicted range image 214 in the example of FIG. 25 is a circular image, and a radius thereof becomes shorter as the accuracy increases.

Moreover, as illustrated in FIG. 25, a range of the remaining distance may be indicated in the navigation information 210. Further, as illustrated in FIG. 25, a plurality of club numbers recommended to be used for the next shot may be indicated in the navigation information 210.

As described above, according to the second embodiment, the user of the user terminal 10 can check the geographical position of the shot ball and the like.

The hole images 206 of FIG. 24 and FIG. 25 is not required to include the navigation information 210.

Figure 26:
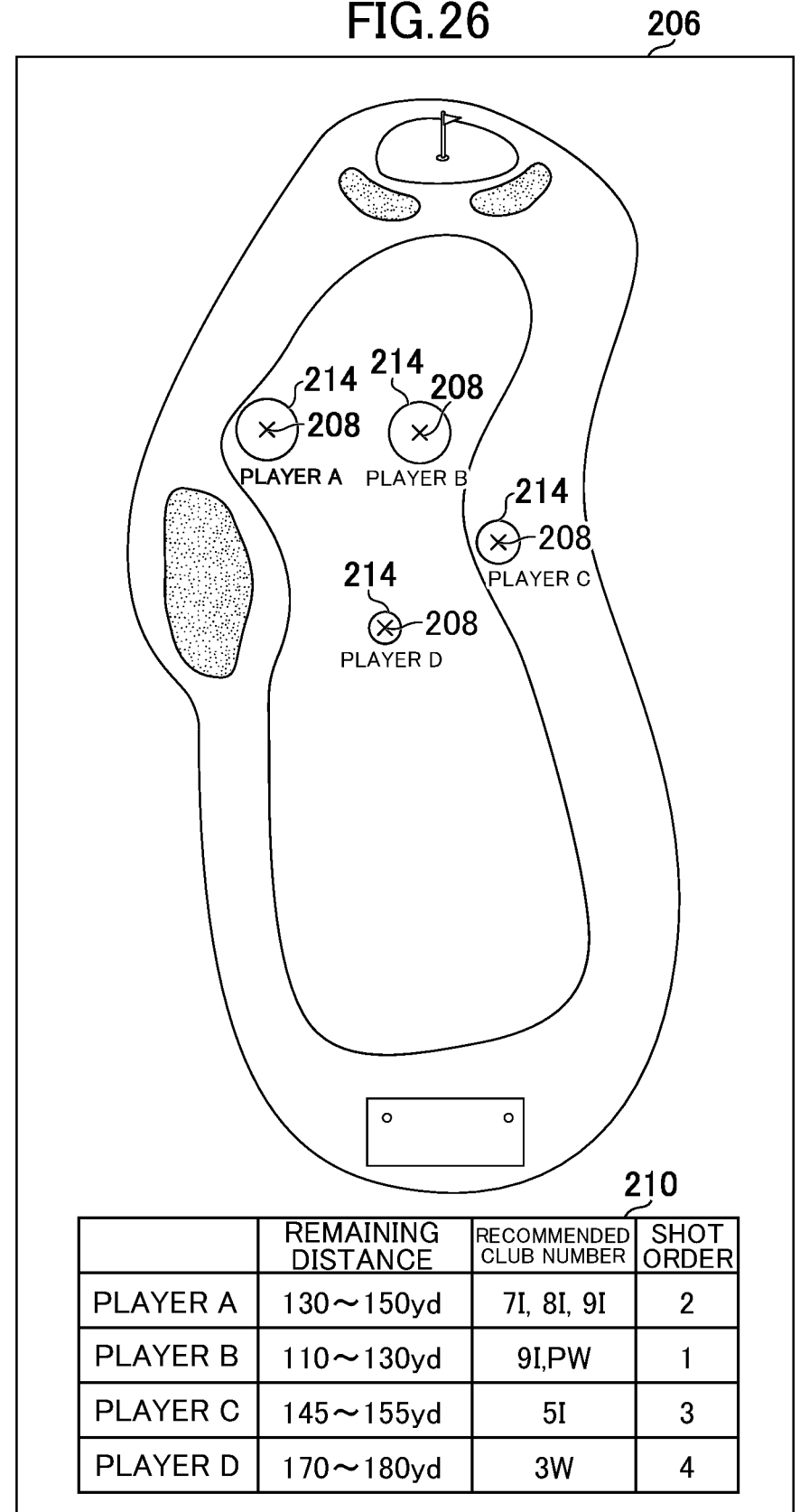
FIG. 26 is a view for illustrating an example of the hole image.

Moreover, in the second embodiment, as illustrated in FIG. 26, there may be generated the hole image 206 including, for example, a plurality of ball position images 208, a plurality of predicted range images 214, and the navigation information 210. In this case, a combination between the ball position image 208 and the predicted range image 214 corresponds to the player who has performed the shot in this hole. Further, the navigation information 210 of FIG. 26 includes character strings indicating, for example, the remaining distance of each player, the club numbers recommended to be used by each player for the next shot, and descending orders in the remaining distance (which, in general, correspond to shooting orders of the next shot).

The hole image 206 of FIG. 26 is not required to include the predicted range images 214. Moreover, the hole image 206 of FIG. 26 is not required to include the navigation information 210. Moreover, in the navigation information 210 of FIG. 26, in place of the ranges of the remaining distance, the remaining distances as illustrated in FIG. 24 may be presented. Moreover, as illustrated in FIG. 26, only one club number or a plurality of club numbers recommended to be used for the next shot may be presented in the navigation information 210. Moreover, the hole image 206 of FIG. 26 may include the terminal position images 212.

Description is further given of functions of the user terminal 10 in the second embodiment and the processing executed in the user terminal 10 in the second embodiment while focusing on processing relating to the generation and the display of the above-mentioned hole image 206.

Figure 27:
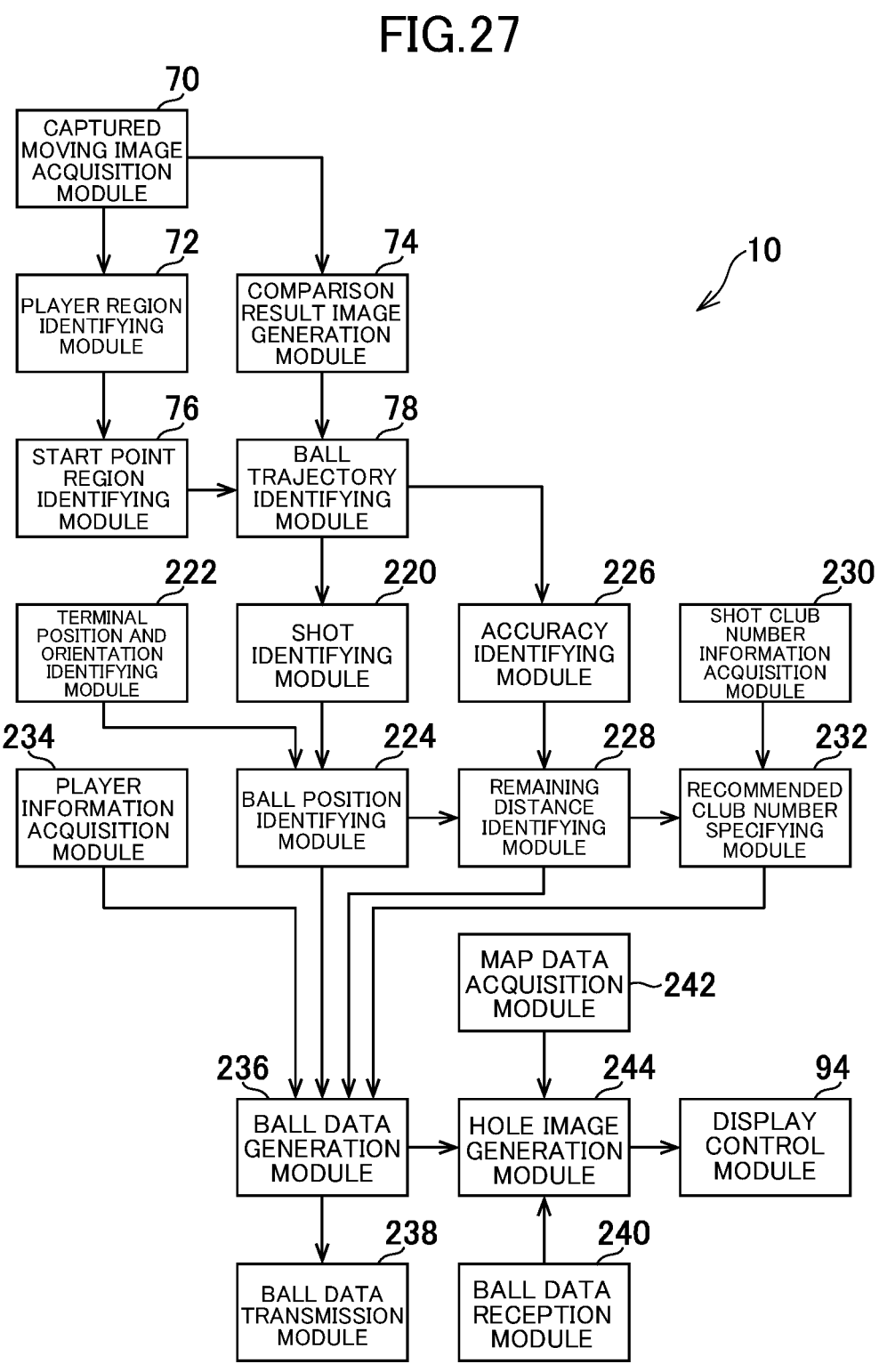
FIG. 27 is a functional block diagram for illustrating an example of the functions of the user terminal in the at least one embodiment of the present invention.

FIG. 27 is a functional block diagram for illustrating an example of the functions implemented in the user terminal 10 in the second embodiment. It is not required to implement all of the functions of FIG. 27 in the user terminal 10 in the second embodiment. Moreover, functions other than the functions of FIG. 27 may be implemented.

The user terminal 10 in the second embodiment has a function as a ball position identifying system which identifies the geographical position of the shot ball. Moreover, as illustrated in FIG. 27, the user terminal 10 in the second embodiment includes, in terms of the function, for example, a captured moving image acquisition module 70, a player region identifying module 72, a comparison result image generation module 74, a start point region identifying module 76, a ball trajectory identifying module 78, a display control module 94, a shot identifying module 220, a terminal position and orientation identifying module 222, a ball position identifying module 224, an accuracy identifying module 226, a remaining distance identifying module 228, a shot club number information acquisition module 230, a recommended club number specifying module 232, a player information acquisition module 234, a ball data generation module 236, a ball data transmission module 238, a ball data reception module 240, a map data acquisition module 242, and a hole image generation module 244.

The captured moving image acquisition module 70, the player region identifying module 72, the comparison result image generation module 74, the start point region identifying module 76, the ball trajectory identifying module 78, the shot identifying module 220, the ball position identifying module 224, the accuracy identifying module 226, the remaining distance identifying module 228, the recommended club number specifying module 232, the ball data generation module 236, and the hole image generation module 244 are implemented mainly by the processor 20. The display control module 94, the shot club number information acquisition module 230, and the player information acquisition module 234 are implemented mainly by the processor 20 and the touch panel 26. The terminal position and orientation identifying module 222 is implemented by mainly the processor 20 and the sensor unit 30. The ball data transmission module 238, the ball data reception module 240, and the map data acquisition module 242 are implemented mainly by the communication unit 24.

The above-mentioned functions may also be implemented by the user terminal 10 executing a program including commands corresponding to the functions, which is installed in the user terminal 10 being a computer. The program may be supplied to the user terminal 10 via, for example, a computer-readable information storage medium, such as an optical disc, a magnetic disk, a magnetic tape, and a magneto-optical disk, or the Internet.

The respective functions of the captured moving image acquisition module 70, the player region identifying module 72, the comparison result image generation module 74, the start point region identifying module 76, and the ball trajectory identifying module 78 are equivalent to those of the captured moving image acquisition module 70, the player region identifying module 72, the comparison result image generation module 74, the start point region identifying module 76, and the ball trajectory identifying module 78 explained in the first embodiment, and description thereof is therefore omitted.

In the second embodiment, the shot identifying module 220 identifies, based on, for example, measurement values being acquired from the user terminal 10 which has measured the shot golf ball and relating to the golf ball, the flight distance of the golf ball and the angle of the direction from the user terminal 10 toward the golf ball with respect to the direction toward which the user terminal 10 is directed at the time of the measurement. The shot identifying module 220 identifies, for example, the flight distance of the golf ball and a horizontal angle of the direction from the user terminal 10 toward the golf ball with respect to the direction toward which the user terminal 10 is directed at the time of the measurement. The horizontal angle as used herein refers to an angle along a horizontal plane.

Functions equivalent to the functions of the flight distance calculation module 80 in the first embodiment may be implemented in the shot identifying module 220. In this case, for example, a signed value indicated in FIG. 15 as a final left-and-right angle and calculated as a final value of a left-and-right angle may be identified as a value indicating the angle of the direction from the user terminal 10 toward the golf ball with respect to the direction toward which the user terminal 10 is directed.

For example, in the manner described in the first embodiment, the ball trajectory identifying module 78 may identify an intra-image position being a position of the golf ball appearing in at least one frame image included in the captured moving image showing the scene of the player shooting the golf ball. Then, the trajectory ball position described in the first embodiment corresponds to the identified intra-image position. After that, the shot identifying module 220 may identify the flight distance of the golf ball and the angle of the direction from the user terminal 10 toward the golf ball with respect to the direction toward which the user terminal 10 is directed at the time of the measurement based on the identified intra-image position.

The shot identifying module 220 is not required to identify the above-mentioned flight distance and the above-mentioned angle based on the captured moving image. For example, when the sensor unit 30 includes a laser sensor, the above-mentioned flight distance and the above-mentioned angle may be identified based on measurement values obtained by the laser sensor.

In the second embodiment, the terminal position and orientation identifying module 222 identifies, for example, a terminal position being a geographical position of the user terminal 10 at the time of the above-mentioned measurement and a terminal orientation being an orientation toward which the user terminal 10 is directed at the time of the measurement. In this case, as the geographical position of the user terminal 10, for example, the latitude and the longitude of the user terminal 10 may be identified. The identified geographical position is not limited to the latitude and the longitude.

In the second embodiment, the ball position identifying module 224 identifies the ball position being the geographical position of the shot ball based on, for example, the above-mentioned terminal position, the above-mentioned terminal orientation, the flight distance identified by the shot identifying module 220, and the angle identified by the shot identifying module 220. In this case, as the geographical position of the shot golf ball, for example, the latitude and the longitude of the golf ball may be identified. The identified geographical position is not limited to the latitude and the longitude.

In the second embodiment, the accuracy identifying module 226 identifies, for example, an accuracy of at least one of the flight distance or the angle identified by the shot identifying module 220. In this case, the accuracy identifying module 226 may identify this accuracy based on the number of frame images in each of which the above-mentioned intra-image position is identified. For example, as the number of frame images in each of which the intra-image position is identified increases, a larger value may be identified as a value indicating the accuracy. Data indicating an association between the number of frame images and the accuracy may be stored in the accuracy identifying module 226. This association may have a numerical expression form or a table form. Then, the value indicating the accuracy may be identified based on this data. It is not required that the accuracy of at least one of the flight distance or the angle be identified based on the number of frame in each of which the intra-image position is identified.

In general, as the flight distance identified by the shot identifying module 220 increases, the value indicating the accuracy identified by the accuracy identifying module 226 is more likely to decrease.

In the second embodiment, the remaining distance identifying module 228 identifies a remaining distance in the hole of the ongoing golf play based on, for example, the ball position identified by the ball position identifying module 224. The remaining distance identifying module 228 may store, for example, green position data indicating a geographical position of the center of a green of the hole of the ongoing golf play or a geographical position of a pin of the green. Further, the remaining distance identifying module 228 may identify the remaining distance based on the green position data and the ball position identified by the ball position identifying module 224.

Moreover, the remaining distance identifying module 228 may identify a range of the remaining distance based on the ball position identified by the ball position identifying module 224 and the above-mentioned accuracy identified by the accuracy identifying module 226. The remaining distance identifying module 228 may identify the range of the remaining distance so that, for example, a magnitude of the range decreases as the value indicating the accuracy identified by the accuracy identifying module 226 increases.

For example, it is assumed that the remaining distance is identified as 140 yards based on the ball position. In this case, when the value indicating the accuracy is 80% or more, the magnitude of the range may be identified as 0 yards. In this case, the distance of 140 yards is identified as the range of the remaining distance. Moreover, when the value indicating the accuracy is 60% or more and less than 80%, the magnitude of the range may be identified as 10 yards. In this case, the distance of from 135 yards to 145 yards is identified as the range of the remaining distance. Further, when the value indicating the accuracy is 40% or more and less than 60%, the magnitude of the range may be identified as 20 yards. In this case, the distance of from 130 yards to 150 yards is identified as the range of the remaining distance.

In the second embodiment, the shot club number information acquisition module 230 acquires, for example, shot club number information indicating a club number used in the shot appearing in the captured moving image. For example, an input operation for specifying the number of the club used in the shot appearing in the captured moving image may be executed by the user before the capture of the captured moving image or after the capture of the captured moving image. Then, the shot club number information acquisition module 230 may acquire the shot club number information indicating the club number specified by the input operation. Moreover, the shot club number information acquisition module 230 may identify the number of the club used in the shot appearing in the captured moving image by, for example, executing image recognition processing on the captured moving image. Then, the shot club number information acquisition module 230 may acquire the shot club number information indicating this club number.

In the second embodiment, the recommended club number specifying module 232 specifies a club number recommended to be used for a next shot based on, for example, the flight distance identified by the shot identifying module 220 and the remaining distance identified by the remaining distance identifying module 228. The club number specified as described above is hereinafter referred to as "recommended club number."

The recommended club number specifying module 232 may generate club number-flight distance association data in which the club number and the flight distance are associated with each other as shown in FIG. 28 and FIG. 29 based on, for example, the flight distance identified by the shot identifying module 220 and the club number indicated by the shot club number information acquired by the shot club number information acquisition module 230. FIG. 28 shows the club number-flight distance association data generated when the flight distance identified at the time of the driver shot is 240 yards. FIG. 29 shows the club number-flight distance association data generated when the flight distance identified at the time of the driver shot is 160 yards.

The club number-flight distance association data may be generated based on, for example, data indicating a calculation formula or a correspondence table held in advance by the recommended club number specifying module 232.

Further, the recommended club number specifying module 232 may specify the recommended club number based on the club number-flight distance association data and the remaining distance identified by the remaining distance identifying module 228. For example, a club number associated with a flight distance matching the remaining distance or a flight distance closest to the remaining distance in the club number-flight distance association data may be specified as the recommended club number. For example, when the remaining distance is 140 yards, and the generated club number-flight distance association data is that of FIG. 28, the 8-iron may be specified as the recommended club number. Meanwhile, when the remaining distance is 140 yards, and the generated club number-flight distance association data is that of FIG. 29, the 3-wood may be specified as the recommended club number.

In this case, the recommended club number specifying module 232 may specify the recommended club number, the number of which corresponds to the range of the remaining distance. Moreover, the recommended club number specifying module 232 may specify the recommended club number, the number of which corresponds to the identified flight distance and range of the remaining distance. For example, in the club number-flight distance association data, one or a plurality of club numbers associated with the flight distance included in the range of the remaining distance may be specified as the recommended club numbers. As another example, in the club number-flight distance association data, club numbers associated with a flight distance closest to the range of the remaining distance may be specified as the recommended club numbers. For example, when the range of the remaining distance is from 130 yards to 150 yards, and the generated club number-flight distance association data is that of FIG. 28, the 7-iron, the 8-iron, and the 9-iron may be specified as the recommended club numbers.

Moreover, for example, when the range of the remaining distance is from 125 yards to 135 yards, and the generated club number-flight distance association data is that of FIG. 29, the 5-wood may be specified as the recommended club number.

There may be provided such a configuration that a driver is not specified as the recommended club number. For example, when the range of the remaining distance is from 170 yards to 180 yards, and the generated club number-flight distance association data is that of FIG. 29, not a driver, but the 3-wood may be specified as the recommended club number.

Moreover, club number-flight distance association data which associates the club number and the range of the flight distance with each other may be generated based on the flight distance identified by the shot identifying module 220, the accuracy identified by the accuracy identifying module 226, and the club number indicated by the shot club number information acquired by the shot club number information acquisition module 230. In the club number-flight distance association data, a club number associated with a range of the flight distance partially or entirely overlapping the range of the remaining distance may be specified as the recommended club number.

In the second embodiment, the player information acquisition module 234 acquires, for example, player information indicating identification information on the player such as a name of the player appearing in the captured moving image. The player information acquisition module 234 may acquire player information indicating identification information on the player such as the name of the player, which is input through an operation of the user before the capture of the captured moving image or after the capture of the captured moving image.

In the second embodiment, the ball data generation module 236 generates, for example, ball data including ball position data indicating the ball position identified by the ball position identifying module 224. In this case, the ball data generation module 236 may generate ball data including remaining distance data indicating the remaining distance or the range of the remaining distance identified by the remaining distance identifying module 228. Moreover, the ball data generation module 236 may generate ball data including accuracy data indicating the accuracy identified by the accuracy identifying module 226. Moreover, the ball data generation module 236 may generate ball data including recommended club number data indicating the number of the club specified by the recommended club number specifying module 232. Moreover, the ball data generation module 236 may generate ball data including the player information acquired by the player information acquisition module 234.

In the second embodiment, the ball data transmission module 238 transmits, for example, the above-mentioned ball position data indicating the ball position. For example, the ball data transmission module 238 transmits, to another user terminal 10, the ball data generated by the ball data generation module 236.

In the second embodiment, the ball data reception module 240 receives, for example, the above-mentioned ball position data indicating the ball position. For example, the ball data reception module 240 receives the ball data transmitted from another user terminal 10. The ball position identifying module 224 may identify, based on the ball position data received by the ball data reception module 240, the ball position associated with this ball position data.

For example, it is assumed that the player A uses the user terminal 10a to take the captured moving image showing the player B. After that, it is assumed that the ball data is generated based on this captured moving image in the user terminal 10a. In this case, the generated ball data may be transmitted from the user terminal 10a to the user terminal 10b through a predetermined transmission operation executed on the user terminal 10a by the player A and a predetermined reception operation executed on the user terminal 10b by the player B. In this manner, in the second embodiment, even when the captured moving image showing the shot of the player B is taken by the user terminal 10a of the player A, the player B can handle, on the user terminal 10b, the ball data which is based on this captured moving image.

Moreover, the ball position identifying module 224 may identify the ball positions for a plurality of golf balls shot by players different from one another. For example, the ball data generation module 236 of the user terminal 10a may generate the ball data on the player A. Then, the ball data reception module 240 of the user terminal 10a may receive the ball data on the player B from the user terminal 10b. Then, the ball data reception module 240 of the user terminal 10a may receive the ball data on the player C from the user terminal 10c. Then, the ball data reception module 240 of the user terminal 10a may receive the ball data on the player D from the user terminal 10d.

After that, the ball position identifying module 224 may identify a plurality of ball positions associated with the player A, the player B, the player C, and the player D, respectively, based on the ball data on the player A generated by the ball data generation module 236, and the ball data on the player B, the ball data on the player C, and the ball data on the player D received by the ball data reception module 240.

In the second embodiment, the map data acquisition module 242 acquires, for example, map data which has geographical positions (for example, latitudes and longitudes) each associated with a corresponding pixel, and includes images, such as aerial images, satellite images, and map images of the golf course on which the golf is played. The map data acquisition module 242 may receive map data on the golf course specified by, for example, an input operation of the user from the map data providing server 202. Moreover, the map data may be stored in the storage unit 22 of the user terminal 10, and the map data acquisition module 242 may acquire the map data stored in the storage unit 22.

In the second embodiment, the hole image generation module 244 generates, for example, the hole images 206 exemplified in FIG. 24 to FIG. 26. In this case, the hole image generation module 244 may generate a hole image 206 in which, for example, the ball position image 208 is arranged so as to be superimposed at the position which is associated with the geographical position of the golf ball identified by the ball position identifying module 224, and exists in the image included in the map data acquired by the map data acquisition module 242.

Moreover, the hole image generation module 244 may generate a hole image 206 on which the predicted range image 214 being the circular image having the center at the position of the ball position image 208, and having the radius associated with the accuracy identified by the accuracy identifying module 226 is arranged so as to be superimposed. For example, data indicating association between the accuracy and the radius may be stored in the hole image generation module 244. This association may have a numerical expression form or a table form. After that, the radius of the predicted range image 214 may be determined based on this data. In this case, for example, as a value indicating the identified accuracy increases, the determined radius may decrease. Further, there may be generated a hole image 206 on which a predicted range image 214 corresponding to the range of the identified remaining distance is arranged so as to be superimposed.

Moreover, the hole image generation module 244 may generate a hole image 206 in which the terminal position image 212 is arranged so as to be superimposed at the position which is associated with the terminal position identified by the terminal position and orientation identifying module 222, and exists in the image included in the map data acquired by the map data acquisition module 242.

Moreover, the hole image generation module 244 may generate a hole image 206 on which navigation information 210 including character strings indicating the remaining distance identified by the remaining distance identifying module 228 and the recommended club numbers specified by the recommended club number specifying module 232 is arranged so as to be superimposed.

Moreover, the hole image generation module 244 may generate a hole image 206 on which the ball position image 208 which is associated with the character string indicating the player information on each of the plurality of players, and indicates the ball position in a shot of this player is arranged so as to be superimposed. Moreover, the hole image generation module 244 may generate a hole image 206 on which the predicted range image 214 being the circular image which has, as the center, the position of the ball position image 208 associated with each of the plurality of players, and has the radius associated with the above-mentioned accuracy for this player is arranged so as to be superimposed. Moreover, the hole image generation module 244 may generate a hole image 206 on which the navigation information 210 including the character strings indicating the remaining distance and the recommended club numbers for each of the plurality of players is arranged so as to be superimposed.

Moreover, the hole image generation module 244 may generate a hole image 206 based on the ball data received by the ball data reception module 240. In this case, the hole image generation module 244 of the user terminal 10a may generate, for example, a hole image 206 showing a plurality of ball positions identified based on the ball position identified based on the measurement value acquired from the user terminal 10a and pieces of ball position data received from the user terminal 10b, the user terminal 10c, and the user terminal 10d, respectively.

Moreover, the hole image generation module 244 may specify descending orders of the remaining distances for the plurality of players based on the remaining distance data included in the ball data. Then, as illustrated in FIG. 26, the hole image generation module 244 may generate a hole image 206 on which navigation information 210 including character strings which indicate the descending orders of the remaining distances is arranged so as to be superimposed. As another example, the hole image generation module 244 may generate a hole image 206 in which a player having the longest remaining distance is displayed so as to be identifiable (for example, the player information on the player having the longest remaining distance is arranged). In general, the player having the longest remaining distance is a player to shoot the next time, and hence this configuration enables appropriate recognition of the player to shoot the next time.

Moreover, the hole image generation module 244 may generate a hole image 206 on which navigation information 210 including character strings indicating the remaining distance or the range of the remaining distance and the recommended club numbers for the player having the longest remaining distance is arranged so as to be superimposed.

In the second embodiment, the display control module 94 displays, for example, the hole images 206 exemplified in FIG. 24 to FIG. 26 on the touch panel 26. As illustrated in FIG. 26, the display control module 94 may display the plurality of ball positions on the touch panel 26 included in the user terminal 10. In this case, for example, the hole image 206 may be displayed in response to a predetermined display operation.

Moreover, the display control module 94 of the user terminal 10 may display, on the touch panel 26, the ball position identified based on the measurement value acquired from this user terminal 10 and the ball positions identified based on the received ball position data.

Moreover, as illustrated in FIG. 26, the display control module 94 may display the hole image 206 in which the information on the orders of the remaining distances for the plurality of players is indicated. In this case, the display control module 94 plays a role as a notification module which notifies the information on the orders of the remaining distances of the plurality players which is generated based on the plurality of ball positions.

The notification of the information on the orders of the remaining distances of the plurality of players is not limited to the form of FIG. 26. For example, the display control module 94 of the user terminal 10 used by the player having the longest remaining distance may display, on the touch panel 26, information indicating that this player is next in the shot order, to thereby provide this notification. Moreover, the display control module 94 is not required to play the role as the notification module. For example, this notification may be provided by outputting predetermined sound from the user terminal 10 used by the player having the longest remaining distance.

Figure 30:
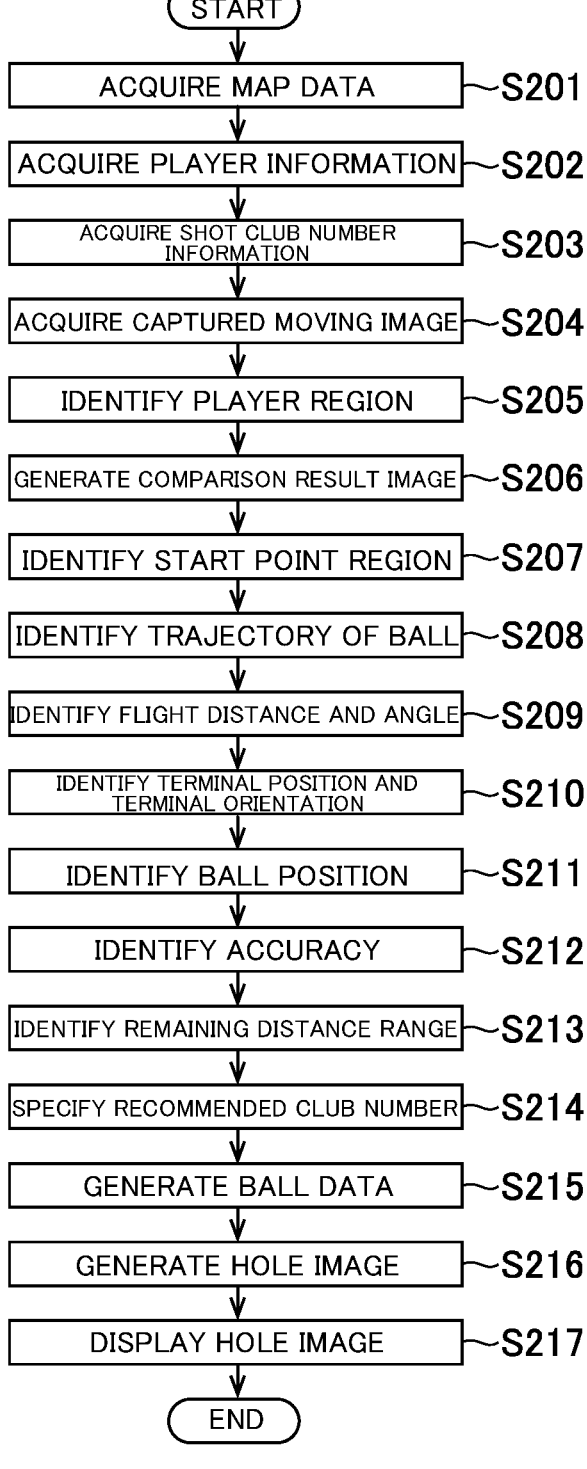
FIG. 30 is a flowchart for illustrating an example of the processing executed in the user terminal in the at least one embodiment of the present invention.

With reference to a flowchart exemplified in FIG. 30, description is now given of an example of a flow of processing executed in the user terminal 10 in the second embodiment.

First, the map data acquisition module 242 acquires the map data (Step S201).

After that, the player information acquisition module 234 acquires the player information on the player to perform the shot (Step S202).

After that, the shot club number information acquisition module 230 acquires the shot club number information indicating the club number used for this shot (Step S203).

After that, the captured moving image starts to be taken, and processing steps of Step S204 to Step S208 are executed. The processing steps of Step S204 to Step S208 are equivalent to the processing steps of Step S101 to Step S105, and description thereof is therefore omitted.

When the trajectory of the ball is identified in the processing step of Step S208, the shot identifying module 220 identifies the flight distance of the golf ball in the shot appearing in the captured moving image acquired in the processing step of Step S204 and the angle of the direction from the user terminal 10 toward the golf ball with respect to the direction toward which the user terminal 10 is directed at the time of the measurement (Step S209).

After that, the terminal position and orientation identifying module 222 identifies the terminal position and the terminal orientation of the user terminal 10 at the time when the captured moving image is taken (Step S210).

After that, the ball position identifying module 224 identifies the ball position based on the terminal position and the terminal orientation identified in the processing step of Step S210 and the flight distance and the angle identified in the processing step of Step S209 (Step S211).

After that, the accuracy identifying module 226 identifies the accuracies of the specification of the flight distance and the angle in the processing step of Step S209 based on the number of frame images in which the trajectory ball position is identified among the frame images included in the captured moving image acquired in the processing step of Step S204 (Step S212).

After that, the remaining distance identifying module 228 identifies the range of the remaining distance based on the ball position identified in the processing step of Step S211 and the accuracies identified in the processing step of Step S212 (Step S213).

After that, the recommended club number specifying module 232 specifies at least one recommended club number based on the club number indicated by the shot club number information acquired in the processing step of Step S203, the flight distance identified in the processing step of Step S209, and the range of the remaining distance identified in the processing step of Step S213 (Step S214).

After that, the ball data generation module 236 generates the ball data including the ball position data indicating the ball position identified in the processing step of Step S211, the accuracy data indicating the accuracies identified in the processing step of Step S212, the remaining distance data indicating the range of the remaining distance identified in the processing step of Step S213, the recommended club number data indicating the recommended club number specified in the processing step of Step S214, and the player information acquired in the processing step of Step S202 (Step S215).

After that, the hole image generation module 244 identifies the hole image 206 based on the ball data generated in the processing step of Step S215 (Step S216).

After that, the display control module 94 displays the hole image 206 generated in the processing step of Step S216 on the touch panel 26 (Step S217), and the process of this processing example is finished.

The ball data generated in the processing step of Step S215 may be transmitted to another user terminal 10 in response to an operation of the user.

Moreover, when ball data received from another user terminal 10 exists before the processing step of Step S216, the hole image 206 may be generated in the processing step of Step S216 based on the ball data generated in the processing step of Step S215 and the received ball data.

As described above, in the second embodiment, the geographical position of the shot golf ball can appropriately be identified without fixing the user terminal 10 which measures the golf ball to a predetermined position.

It should be noted that the present invention is not limited to the above-mentioned embodiments.

For example, when the map data includes a 3D model of the geography, the final ball position may be determined based on an inclination at the position identified by the ball position identifying module 224.

Moreover, the hole image 206 including the terminal position image 212 may be displayed on the touch panel 26 of the user terminal 10 in response to a predetermined operation on this user terminal 10 before the captured moving image is taken. This hole image 206 does not include the ball position image 208, the navigation information 210, and the predicted range image 214.

Moreover, the present invention can be applied not only to the case in which the geographical position of the golf ball shot in the tee shot is identified, but also to a case in which a geographical position of the golf ball shot in a second or later shot is identified.

Further, the specific character strings and numerical values described above and the specific numerical values and character strings in the drawings are merely exemplary, and the present invention is not limited to those character strings and numerical values.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A ball position identifying system comprising:
at least one memory device storing computer program code; and
at least one processor configured to execute the computer program code and to cause the ball position identifying system to operate according to the computer program code, wherein the computer program code comprises:
flight distance identification code configured to cause at least one of the at least one processor to identify, based on a measurement value acquired from a measurement terminal, a flight distance of a golf ball that has been hit by a clubhead, a trajectory of the clubhead at a time of impact with the golf ball, and an angle between a line extending over a shortest distance between the measurement terminal and the golf ball at a time of the measurement and a line extending in a direction which the measurement terminal is directed at the time of the measurement;
terminal position identification code configured to cause at least one of the at least one processor to identify a geographical position of the measurement terminal at the time of the measurement and an orientation toward which the measurement terminal is directed at the time of the measurement;
ball position identification code configured to cause at least one of the at least one processor to identify a geographical position of the golf ball after it lands based on the terminal position, the terminal orientation, the flight distance, the trajectory of the clubhead, and the angle;
image acquisition code configured to cause at least one of the at least one processor to acquire a captured moving image through an imaging unit included in the measurement terminal;

image analysis code configured to cause at least one of the at least one processor to identify an intra-image position of the golf ball in at least one frame of the captured moving image; and accuracy identification code configured to cause at least one of the at least one processor to identify, based on a number of the at least one frame in which the intra-image position is identified, an accuracy of at least one of the flight distance or the angle.

2. The ball position identifying system of claim 1, wherein the image acquisition code is further configured to cause at least one of the at least one processor to cause a scene of a player hitting the golf ball to be displayed on a display, and wherein the flight distance identification code is further configured to cause at least one of the least one processor to identify the flight distance of the golf ball and the angle based on the intra-image position.

3. The ball position identifying system of claim 1, wherein the computer program code further comprises:

remaining distance identification code configured to cause at least one of the at least one processor to identify a remaining distance in a hole of ongoing golf play based on the geographical position of the golf ball and the accuracy; and recommended club specifying code configured to cause at least one of the at least one processor to identify a club number which is recommended to be used for a next shot, wherein the club number corresponds to and is based on the flight distance and the remaining distance.

4. The ball position identifying system of claim 1, wherein the computer program code further comprises:

remaining distance identification code configured to cause at least one of the at least one processor to identify a remaining distance in a hole of ongoing golf play based on the geographical position of the golf ball; and recommended club specifying code configured to cause at least one of the at least one processor to identify a club number which is recommended to be used for a next shot based on the flight distance and the remaining distance.

5. The ball position identifying system of claim 4, wherein the remaining distance identification code is further configured to identify the remaining distance based on the geographical position of the golf ball and the accuracy.

6. The ball position identifying system of claim 1, wherein the flight distance identification code is further configured to cause at least one of the at least one processor to identify, based on respective measurement values acquired from the measurement terminal, respective flight distances of each of a plurality of golf balls that have been hit by a clubhead from among one or more clubheads, a trajectory of each of the one or more clubheads at a time of impact with the respective golf ball of the plurality of golf balls, and an angle between a line extending over a shortest distance between the measurement terminal and each of the plurality of golf balls at a time of the measurement and a line extending in a direction which the measurement terminal is directed at the time of the respective measurements, wherein the terminal position identification code is further configured to cause at least one of the at least one processor to identify a geographical position of the measurement terminal at the time of each of the respective measurements and an orientation toward which the measurement terminal is directed at the time of each of the respective measurements, wherein the ball position identification code is further configured to cause at least one of the at least one processor to identify respective geographical positions for each of the plurality of golf balls after they land based on the respective terminal position, terminal orientation, flight distance, and trajectory of the club-head associated with each of the plurality of golf balls, and wherein the computer program code further comprises hole image generation code configured to cause at least one of the at least one processor to display the geographical positions of the plurality of golf balls on a display unit included in the measurement terminal.

7. The ball position identifying system of claim 6, wherein the hole image generation code is further configured to cause at least one of the at least one processor to generate notification information comprising an order of remaining distances associated with the geographical positions of the plurality of golf balls, and displaying the notification information on the display.

8. The ball position identifying system of claim 1, wherein the computer program code further comprises ball data transmission code configured to cause at least one of the at least one processor to transmit ball position data comprising the geographical position of the golf ball.

9. A ball position identifying method comprising:

identifying, based on a measurement value acquired from a measurement terminal, a flight distance of a golf ball that has been hit by a clubhead, a trajectory of the clubhead at a time of impact with the golf ball, and an angle between a line extending over a shortest distance between the measurement terminal and the golf ball at a time of the measurement and a line extending in a direction which the measurement terminal is directed at the time of the measurement;

identifying a geographical position of the measurement terminal at the time of the measurement and an orientation toward which the measurement terminal is directed at the time of the measurement;

identifying a geographical position of the golf ball after it lands based on the terminal position, the terminal orientation, the flight distance, the trajectory of the clubhead, and the angle;

acquiring a captured moving image through an imaging unit included in the measurement terminal;

identifying an intra-image position of the golf ball in at least one frame of the captured moving image; and identifying, based on a number of the at least one frame in which the intra-image position is identified, an accuracy of at least one of the flight distance or the angle.

10. A non-transitory computer readable medium having instructions stored therein, which when executed by at least one processor cause the at least one processor to execute a method of identifying a ball position, the method comprising:

identifying, based on a measurement value acquired from a measurement terminal, a flight distance of a golf ball that has been hit by a clubhead, a trajectory of the clubhead at a time of impact with the golf ball, and an angle between a line extending over a shortest distance between the measurement terminal and the golf ball at a time of the measurement and a line extending in a direction which the measurement terminal is directed at the time of the measurement;

identifying a geographical position of the measurement terminal at the time of the measurement and an orientation toward which the measurement terminal is directed at the time of the measurement;

identifying a geographical position of the golf ball after it lands based on the terminal position, the terminal orientation, the flight distance, the trajectory of the clubhead, and the angle;

acquiring a captured moving image through an imaging unit included in the measurement terminal;

identifying an intra-image position of the golf ball in at least one frame of the captured moving image; and identifying, based on a number of the at least one frame in which the intra-image position is identified, an accuracy of at least one of the flight distance or the angle.

\* \* \* \* \*